United States Patent [19]

Takakura et al.

[11] Patent Number: 5,574,842
[45] Date of Patent: Nov. 12, 1996

[54] DOCUMENT PROCESSING APPARATUS AND METHOD FOR GENERATING A CHARACTER OR SYMBOL PATTERN ACROSS A PLURALITY OF LINES

[75] Inventors: Hiroshi Takakura, Yokohama; Takahiro Kato; Kunio Seto, both of Tokyo; Akifumi Shirasaka; Masaki Hamada, both of Yokohama, all of Japan

[73] Assignee: Canon Kabushiki Kaisha, Tokyo, Japan

[21] Appl. No.: 397,711

[22] Filed: Mar. 2, 1995

Related U.S. Application Data

[63] Continuation of Ser. No. 84,328, Jun. 30, 1993, abandoned, which is a continuation of Ser. No. 385,399, Jul. 26, 1989, abandoned.

[30] Foreign Application Priority Data

| Jul. 29, 1988 | [JP] | Japan | 63-188353 |
| Jul. 29, 1988 | [JP] | Japan | 63-188354 |
| Jul. 29, 1988 | [JP] | Japan | 63-188355 |
| Jul. 29, 1988 | [JP] | Japan | 63-188356 |
| Jul. 29, 1988 | [JP] | Japan | 63-188357 |

[51] Int. Cl.$^6$ ............................................. G06F 17/21
[52] U.S. Cl. .................. 395/805; 364/926.7; 364/725.8; 364/225.9; 364/DIG. 1; 364/237.6; 364/DIG. 2
[58] Field of Search .................... 395/150, 151, 395/148, 114; 345/141, 143, 116, 127, 189, 192, 194, 195; 364/518

[56] References Cited

U.S. PATENT DOCUMENTS

| 3,936,664 | 2/1976 | Sato | 395/150 |
| 4,079,458 | 3/1978 | Ridet et al. | 395/151 |
| 4,231,096 | 10/1980 | Hansen et al. | 364/900 |
| 4,251,871 | 2/1981 | Yu | 364/518 |
| 4,621,340 | 11/1986 | Pokorny et al. | 395/150 |
| 4,803,643 | 2/1989 | Hickey | 364/523 |
| 4,959,801 | 9/1990 | Apley et al. | 364/518 |
| 4,979,130 | 12/1990 | Li et al. | 364/518 |
| 4,980,840 | 12/1990 | Yin et al. | 354/518 |
| 4,990,903 | 2/1991 | Cheng et al. | 340/731 |
| 4,998,211 | 3/1991 | Hamada et al. | 364/518 |
| 5,050,103 | 9/1991 | Schiller et al. | 364/521 |
| 5,251,293 | 10/1993 | Iship et al. | 395/151 |
| 5,280,577 | 1/1994 | Trevett et al. | 395/150 |
| 5,309,554 | 5/1994 | Ito | 395/150 |
| 5,398,311 | 3/1995 | Seto | 395/151 |

OTHER PUBLICATIONS

John Voelcker, Technology '88: Software, IEEE Spectrum, p. 40 Jan. 1988.

Tekla S. Perry, PostScript prints anything: a case history, IEEE Spectrum, pp. 42–46 May 1988.

Pehong Chem, Gnu Emacs TeX Mode v1.6, University of California, Berkeley, Computer Science Division Feb. 1987.

(List continued on next page.)

*Primary Examiner*—Thomas G. Black
*Assistant Examiner*—Peter Y. Wang
*Attorney, Agent, or Firm*—Fitzpatrick, Cella, Harper & Scinto

[57] ABSTRACT

A document processing apparatus and method inputs character code information corresponding to a character to be output, stores a character or symbol pattern in the form of a plurality of fonts, discriminates whether a character or a symbol pattern to be output exists across a plurality of lines, generates one character or a symbol pattern existing across a single line from one stored font based on one character code of the input character code information in the event that the character or symbol pattern to be output is discriminated to exist, across only a single line, and generates one character or symbol pattern existing across a plurality of lines from the plurality of stored fonts based on one character code of the input character code information in the event that the character or symbol pattern to be output is discriminated to exist across a plurality of lines.

28 Claims, 24 Drawing Sheets

OTHER PUBLICATIONS

Naoyuki Kai, et al., A High Speed Outline Font Rasterizing LSI, IEEE 1989 Custom Integrated Circuits Conf, pp. 24.6.1–24.6.4.

Marilyn Martin, The Semiology of Documents, IEEE Trans. Prof. Comm, v.32, n.3, pp. 171–177 Sep. 1989.

Product Review: TeXnology on the IBM PC, IEEE Computer, pp. 111–120 Aug. 1989.

LaTeX Introduction, University of Washington, Computing and Communications Jan. 1989.

Abhay Bhushan et al., The Interpress page and document description language, IEEE Computer, pp. 72–77 Jun. 1986.

FIG. 5

| CONTROL DATA | | | 50 |
|---|---|---|---|
| COORDINATES | | ATTRIBUTE FLAG | 53 |
| X | Y | | |
| 0 | 0 | 0× 10 | ← 51 |
| 30 | 0 | 0× 00 | ← 52, 54 |
| 256 | 482 | 0× 00 | |
| ⋮ | ⋮ | ⋮ | |
| 0 | 512 | 0× 00 | |

FIG. 6

| MANAGEMENT TABLE | 104 |
|---|---|
| FONT ADDRESS JIS2121 | |
| FONT ADDRESS JIS2122 | |
| FONT ADDRESS JIS2123 | |
| FONT ADDRESS JIS2124 | |
| ⋮ | 60 |
| FONT ADDRESS JIS7423 | |
| FONT ADDRESS JIS7424 | |

FIG. 7

| MANAGEMENT TABLE | 105 |
|---|---|
| FONT ADDRESS JIS CODE | |
| FONT ADDRESS JIS CODE | |
| ⋮ | 61 |
| FONT ADDRESS JIS CODE | |

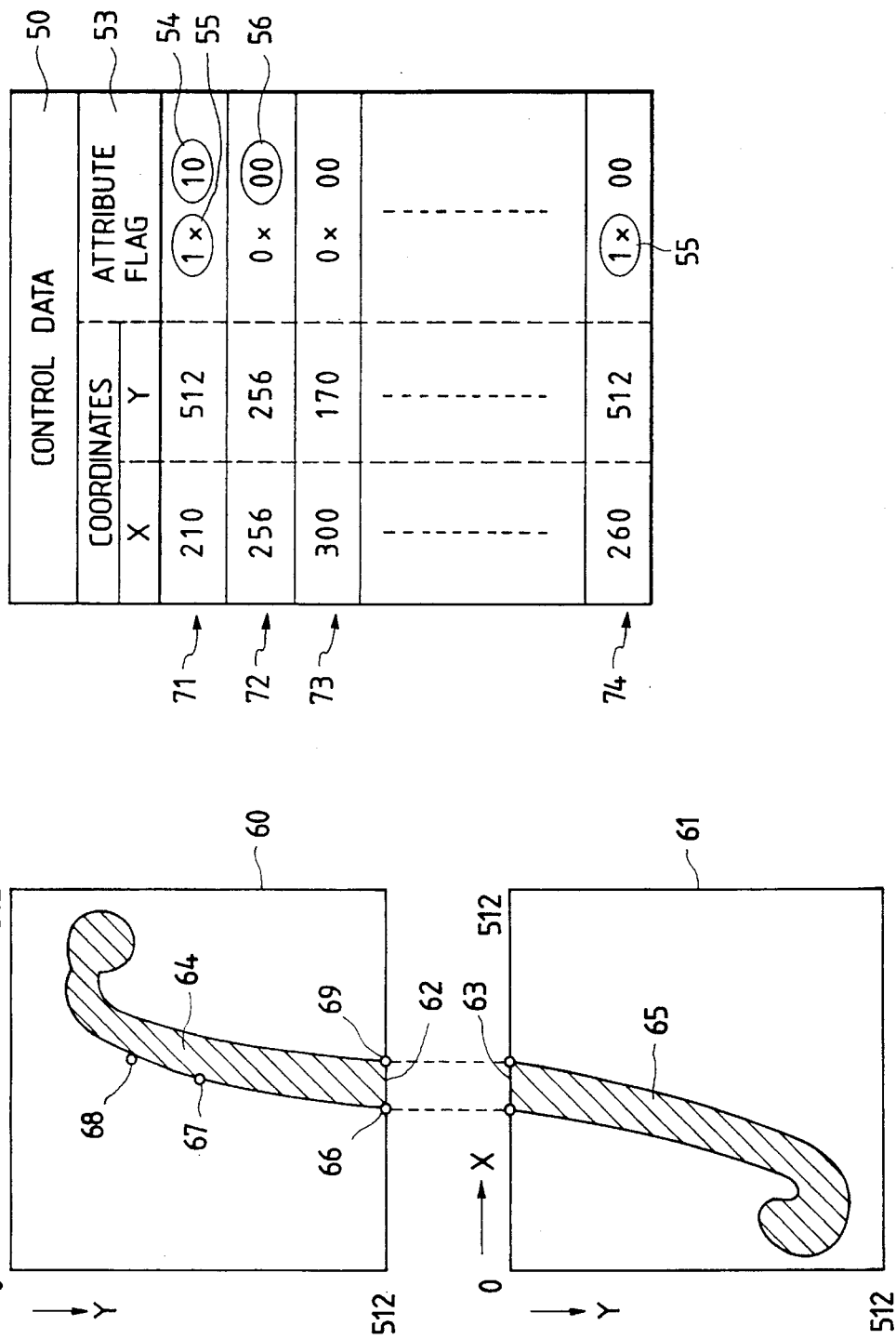

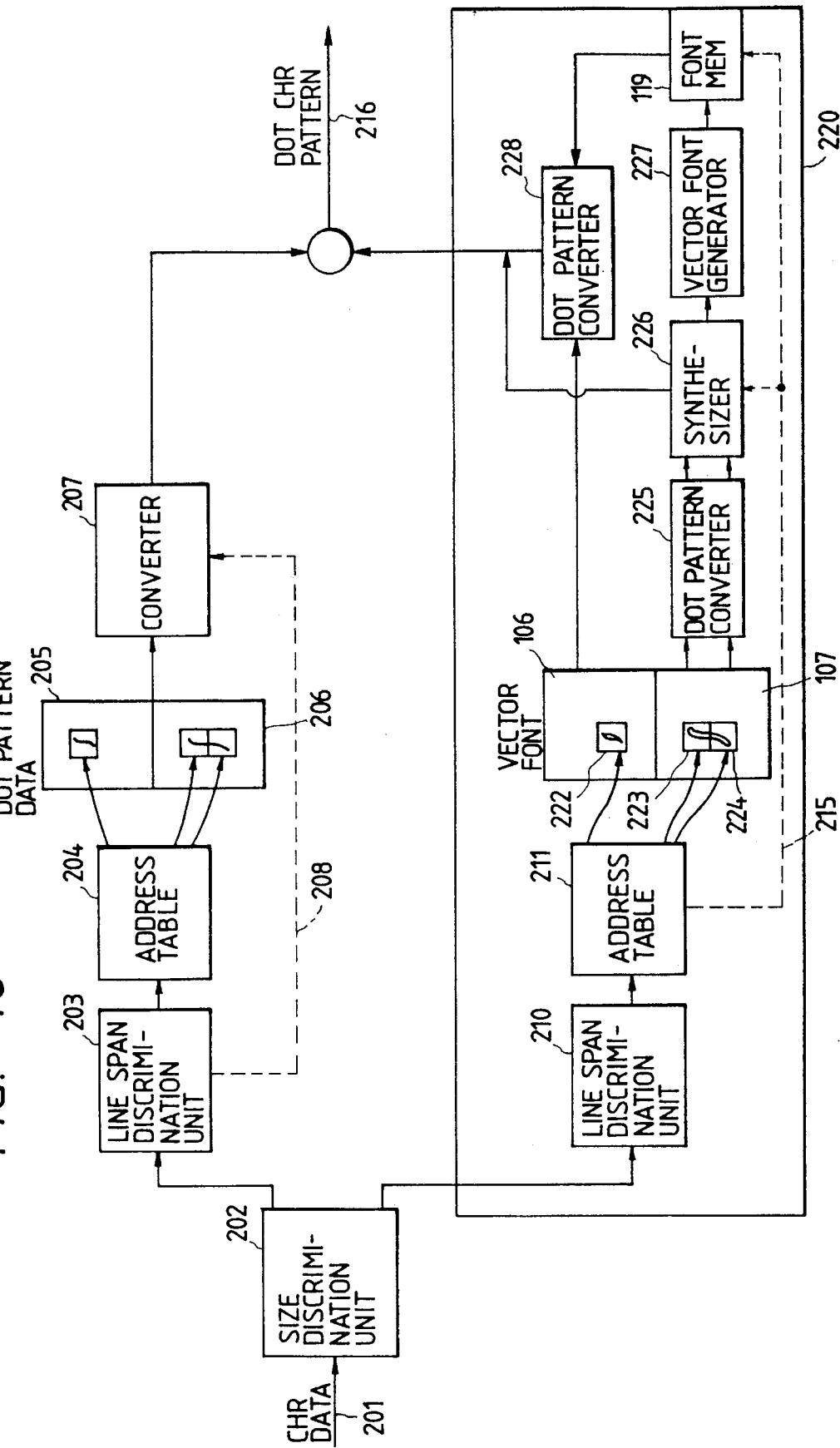

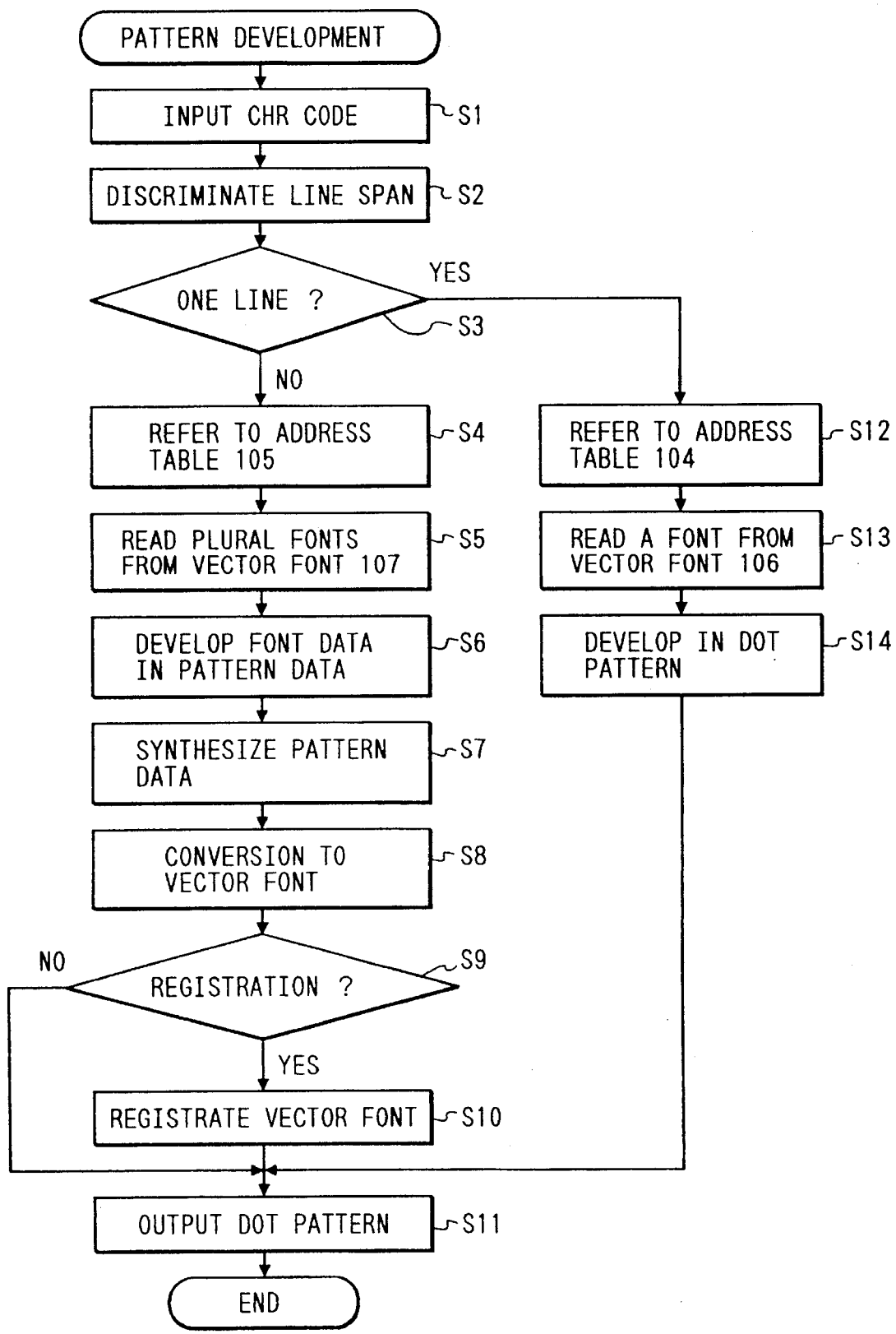

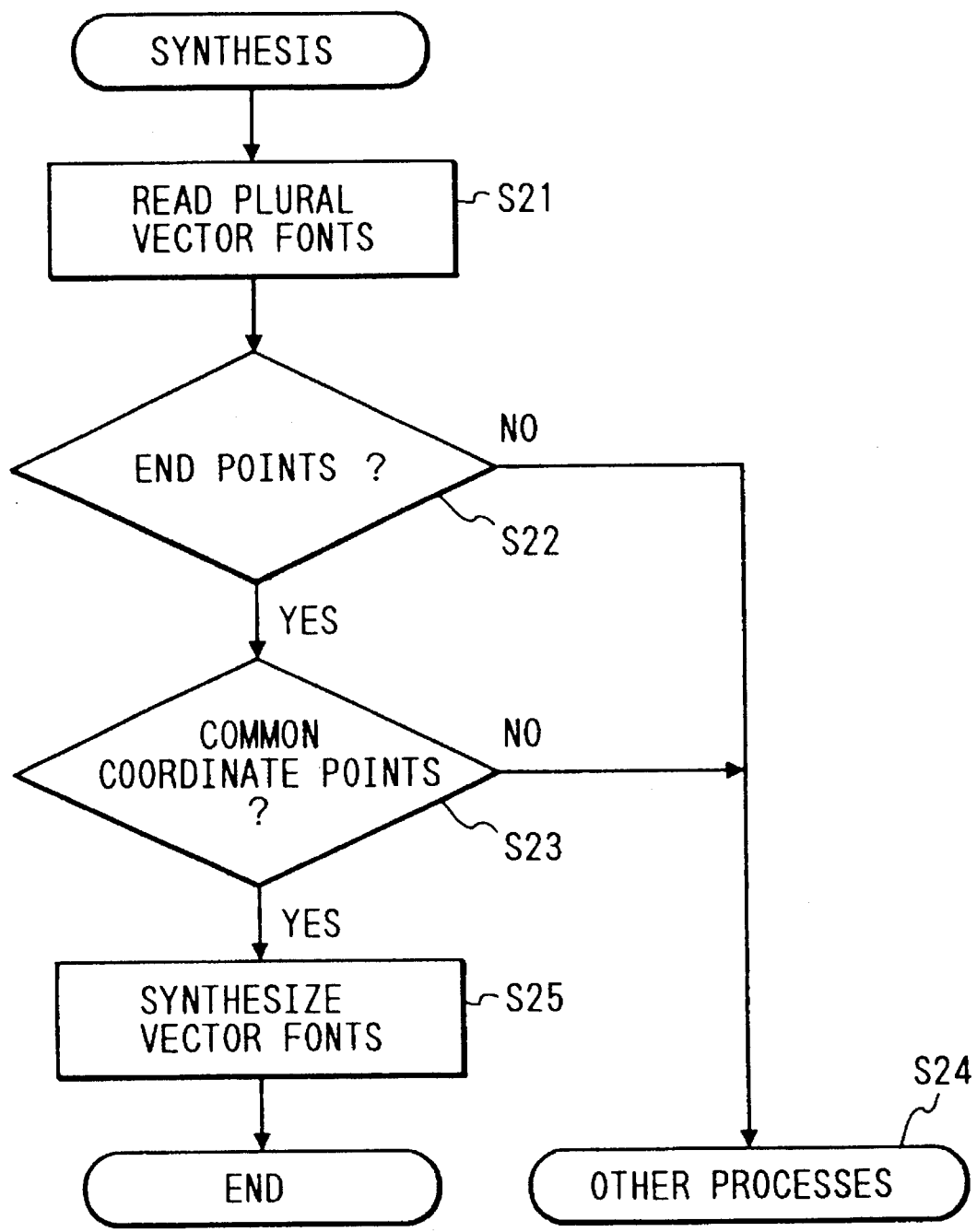

FIG. 30
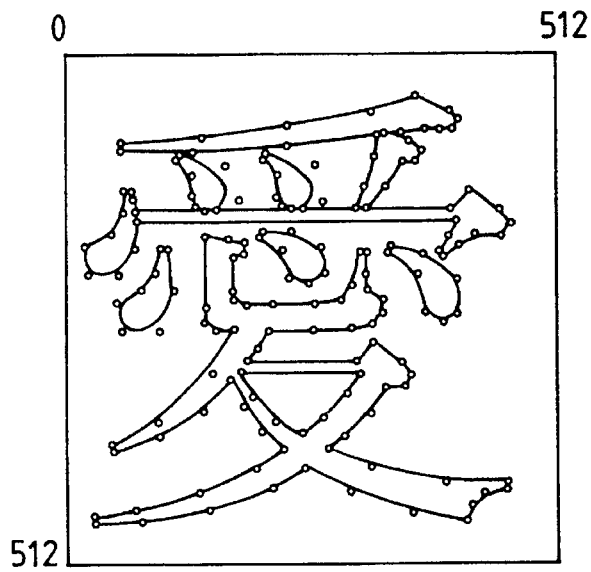
FIG. 31
| CONTROL DATA | | | 50 |
|---|---|---|---|
| COORDINATES | | ATTRIBUTE FLAG | 53 |
| X | Y | | |
| 210 | 512 | 1 × 10 | ← 71 |
| 256 | 256 | 0 × 00 | ← 72 |
| 300 | 170 | 0 × 00 | ← 73 |
| ⋮ | ⋮ | ⋮ | |
| 260 | 512 | 0 × 00 | ← 74 |
FIG. 33
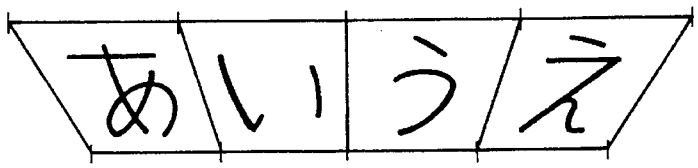

DOCUMENT PROCESSING APPARATUS AND METHOD FOR GENERATING A CHARACTER OR SYMBOL PATTERN ACROSS A PLURALITY OF LINES

This application is a continuation of application Ser. No. 08/084,328, filed Jun. 30, 1993, now abandoned, which is a continuation of application Ser. No. 07/385,399 filed Jul. 26, 1989, now abandoned.

BACKGROUND OF THE INVENTION (a) Field of the Invention

The present invention relates to a document processing apparatus for storing font data of character and graphic patterns in the form of vectors.

The present invention also relates to a document processing apparatus for storing font data of character and graphic patterns in the form of dots and vectors.

(b) Related Background Art

In a conventional document processing apparatus having vector fonts, document font data to be displayed or printed is generally stored as line-segment data of each character in the form of vectors represented by display start and end positions of the character. Schemes for actually generating line segments of these vector fonts are a scheme using line segments, a scheme for interpolating line segments by using arcs or three-dimensional splines, and a scheme for generating line segments by using B-splines. Of vector fonts, fonts for representing character outlines in the form of vectors are often called outline fonts.

Since vector fonts need not have font data in units of character sizes, they require only a small memory capacity and provide smooth outlines of characters even in an enlargement/reduction mode, as compared with fonts constituted by dot matrices.

When a character or the like constituted by such a vector font is developed into pattern data, some characters are displayed as pattern data extending across a plurality of lines (e.g., an integral, a sigma, or "["")" of a matrix in mathematical expressions). Vector fonts for these symbols are stored in the form of fonts corresponding to character sizes included in one line as in normal characters. When pattern data extending across a plurality of lines is developed, enlargement or the like is performed in correspondence with the number of lines.

When enlargement is performed across a plurality of lines, the patterns of the characters and symbols become unnatural, thus degrading printing quality and resulting in a time-consuming operation in enlargement of font data. This problem occurs in a case where a character is enlarged in either of the row and column directions.

Of characters whose outlines are constituted by vector fonts, plural vector fonts are synthesized to generate one character pattern such as a logograph designed by an externally input character. When this character font is developed into pattern data, an outline of each font data is formed by a closed loop. In synthesis of a plurality of font data to convert synthesized font data into pattern data, no problem occurs when the synthesized font data is converted into a solid black dot pattern. However, for example, when a dot pattern is converted, its outline (boundary) is left unconcealed.

Of characters constituted by these vector fonts, plural vector fonts are synthesized to generate one character pattern. When this character font is developed into pattern data, the divided font data corresponding to character codes must be read out, and these font data are synthesized. The synthesized font data is then converted into a dot pattern. For this reason, it takes a long period of time to display a character or symbol constituted by plural vector fonts. In addition, when an area inside the outline constituted by the synthesized vector font is painted in black or is hatched or meshed with halftone dots, special processing is required for a boundary of each vector font constituted by a closed loop. That is, after each outline font is synthesized, boundary lines are visible in halftone dot meshing although these boundary lines are invisible in painting in black.

For example, as for such a vector font, one character pattern is divided into upper and lower halves and each vector font is stored in correspondence with a character code. When a corresponding character code is input, plural vector fonts are synthesized to generate one character pattern. However, no conventional apparatus capable of performing the above operations is available. In order to develop this character font into pattern data in practice, connections of the font data pose problems. In particular, when font data represents an outline, each font data is constituted by a closed loop. When a plurality of font data are synthesized and the synthesized font data is converted into pattern data, special processing must be performed for the outline portion of each font data.

In a wordprocessor or the like, character and graphic patterns are often displayed in a development display area on the basis of composition data or the like. In order to produce and display a document within a predetermined frame, a display character font corresponding to an input character code is developed within an area recognized by a format or frame input by an operator, thereby performing a pattern display.

Some wordprocessors can modify display data to display hollow characters, reversed characters, italic characters, and shadowed characters (shadow display).

When a character displayed within the display area is modified into an italic character, the italic character and its display frame are unbalanced. For this reason, the display frame must also be inclined in accordance with an inclination angle of the italic character. Similarly, when a display frame is to be inclined at a predetermined angle and a character displayed within the frame is kept upright, the frame and the character are unbalanced. Therefore, the character is also displayed as an italic character. However, italic display processing of the character must be performed independently of that of the frame representing the display area, resulting in cumbersome operations. At the same time, it is difficult to match the inclination angle of the italic character with that of the display frame representing the display area.

A modification of the frame must be performed by inputting a modification coefficient as a parameter from a keyboard regardless of whether the modified display frame is displayed or not. An unskilled operator cannot appropriately set an optimal parameter, and it is therefore difficult to perform a desired character modification. Modification versatility inherent to vector data cannot be sufficiently utilized in a wordprocessor.

When a pattern having dot and vector fonts and extending across a plurality of lines is to be generated and then operations for simultaneously synthesizing a plurality of dot fonts and plural vector fonts are taken into consideration, these operations cannot be equally managed.

SUMMARY OF THE INVENTION

It is an object of the present invention to eliminate the conventional drawbacks in consideration of the foregoing.

It is another object of the present invention to provide a document processing apparatus for selectively synthesizing vector font data divided and stored in correspondence with a pattern developed across a plurality of lines and for easily developing a high-quality font across the plurality of lines in consideration of the foregoing.

It is still another object of the present invention, in consideration of the conventional examples, to provide a document processing apparatus wherein when plural vector fonts are synthesized to generate a vector font corresponding to a character or symbol, an outline (boundary portion) common to the vector fonts is deleted, and outline data corresponding to the character or symbol is generated, thereby easily developing the vector font into a dot pattern.

It is still another object of the present invention to provide a document processing apparatus capable of storing as a new font a synthesized vector font obtained by synthesizing plural vector fonts.

It is still another object of the present invention, in consideration of the conventional examples, to provide a document processing apparatus wherein when a plurality of fonts are synthesized to generate a vector font corresponding to a character or symbol, each vector font is developed into a dot pattern, the developed dot patterns are synthesized, and a new vector font is generated by the synthesized dot pattern, thereby facilitating synthesis of vector fonts and development of the synthesized font into the dot pattern.

It is still another object of the present invention to provide a document processing apparatus capable of generating a synthesized vector pattern without generating a dot pattern.

It is still another object of the present invention, in consideration of the conventional examples, to provide a document processing apparatus wherein when plural vector fonts are synthesized to generate a synthesized vector font corresponding to a character code, end points common to the vector fonts are directly or indirectly connected to generate outline data corresponding to the character code, thereby facilitating development of the vector font into dot pattern data.

It is still another object of the present invention, in consideration of the conventional examples, to provide a document processing apparatus wherein a display frame representing a display area of characters and the like is modified (e.g., inclined) by an arbitrary amount, and characters within the display area can be automatically modified by the arbitrary amount and displayed within the modified display frame.

It is still another object of the present invention to provide a document processing apparatus wherein a display frame is modified by an instruction from a pointing device, and characters within the display area can be automatically modified by the corresponding amount and displayed within the modified display frame, thereby improving operability of the operator.

It is still another object of the present invention to provide a document processing apparatus wherein when a pattern having both dot and vector fonts and extending across a plurality of lines is to be generated, operations for synthesizing a plurality of dot fonts and plural vector fonts can be equally managed.

BRIEF DESCRIPTION OF THE DRAWINGS

FIG. 5 is a table showing vector font data;

FIGS. 6 and 7 are data formats of address tables of the embodiment shown in FIG. 1;

FIG. 10 is a view showing a vector font data pattern;

FIG. 11 is a view showing vector font data;

FIG. 16 is a view for explaining a pattern development process;

FIG. 17 is a flow chart of a registration process of synthesized vector data;

FIG. 19 is a flow chart for performing synthesis without converting the vector data;

FIG. 30 is a view showing sample points of a character according to a B-spline scheme;

FIG. 31 is a view showing vector font data of the embodiment shown in FIG. 25;

FIG. 33 is a view showing a modified character string in the embodiment shown in FIG. 25.

DETAILED DESCRIPTION OF THE PREFERRED EMBODIMENTS

Preferred embodiments of the present invention will be described in detail with reference to the accompanying drawings. The present invention can be achieved by a system consisting of a plurality of devices or a single device. The present invention can also be achieved by connecting a document processing apparatus to another system or device through a network.

Synthesis of Vector Data

[Description of Document Processing Apparatus (FIG. 1)]

Figure 1:
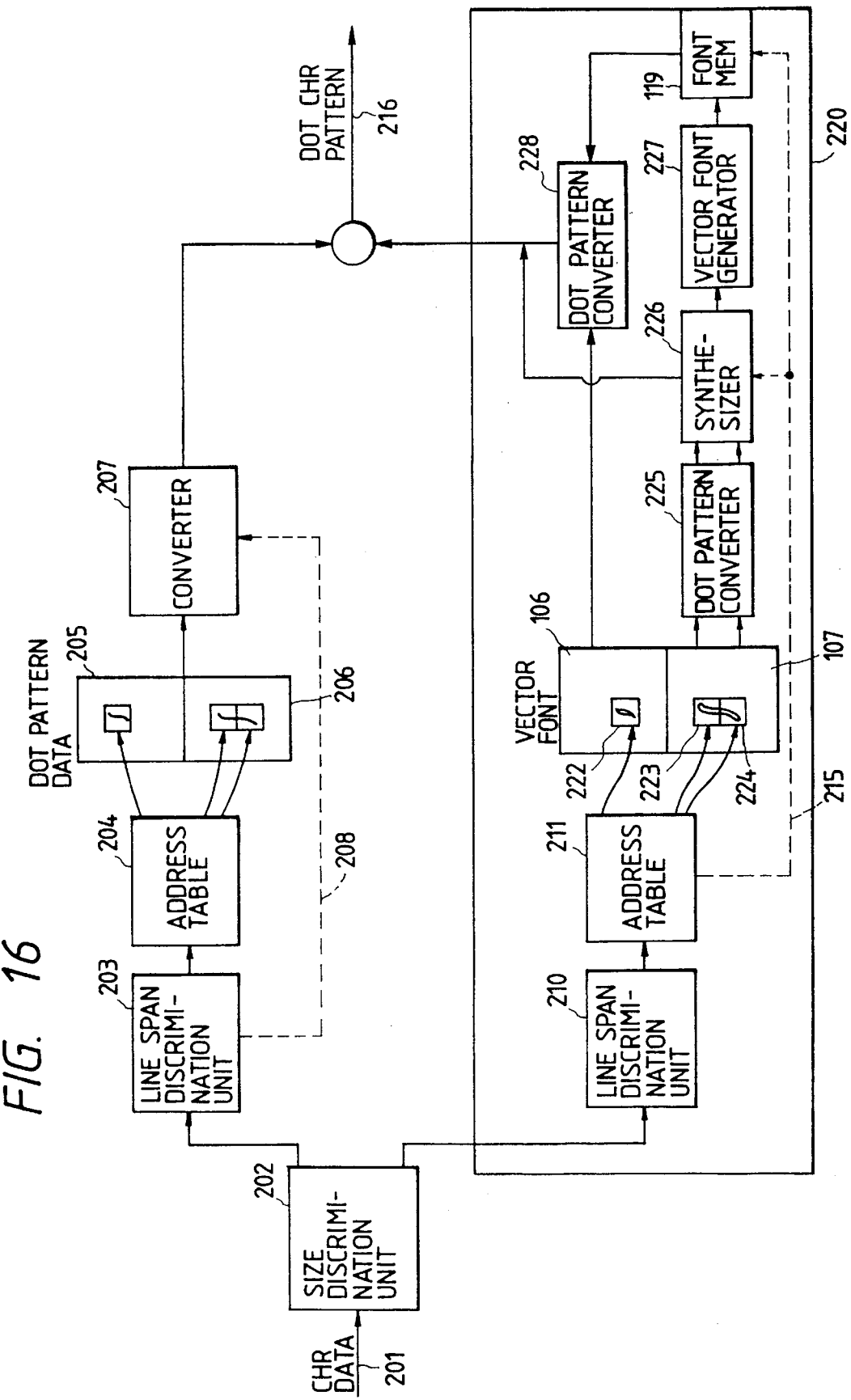
FIG. 1 is a block diagram showing a schematic arrangement of a document processing apparatus according to an embodiment of the present invention.

FIG. 1 is a block diagram showing a schematic arrangement of a document processing apparatus according to an embodiment of the present invention.

Referring to FIG. 1, a controller 100 includes a CPU 101 such as a microcomputer, a ROM 102 storing control programs (flow charts to be described later) and various data, and a RAM 103 serving as a work area of the CPU 101 to temporarily store various data. The controller 100 also includes address tables 104 and 105 for storing addresses of font data in correspondence with sizes of character patterns. The table 104 is used to refer to font data of a normal character size (within one line; has a one-line span), and the table 105 stores the addresses for reading out font data of a large character size (extending across a plurality of lines; has a span of a plurality of lines).

The controller 100 further includes font memories 106 and 107 for storing font data of characters or the like in the form of vector fonts. The font memory 106 stores the font data of a normal character size, and the font memory 107 stores the font data of a large size extending across a plurality of lines. The font data of a large size is divided into pieces each having the same font size as that of the font data of the normal character size stored in the font memory 106, and the divided data are stored in the font memory 107.

A CRT display 110 displays an image corresponding to dot information stored in a video memory 111 as well as input document data, messages to an operator, and control data. A keyboard 112 is used to input document data and control data entered by the operator. A pointing device 113 causes an operator to move a cursor or the like on the CRT display 110, designate a command image such as an icon so as to input a command, and designate a coordinate position on the screen. A printer 114 comprises, e.g., a laser beam printer. An interface (I/F) 115 performs interface control between the printer 114 and the controller 100. An image memory 116 stores image data representing characters or the like. Image data is read out from the image memory 116 in response to an instruction output from the keyboard 112 or the pointing device 113, and the readout image data is output to and printed at the printer 114.

A bit manipulation unit (BMU) 117 is used as a pattern developing means or pattern modifying means in this embodiment. When a modification interval of any character string developed and dislayed on the CRT display 110 and character modification data for the character string are input by the pointing device 113, display data corresponding to the characters within the designated interval are modified and developed.

[Description of Pattern Development (FIG. 2)]

Figure 2:
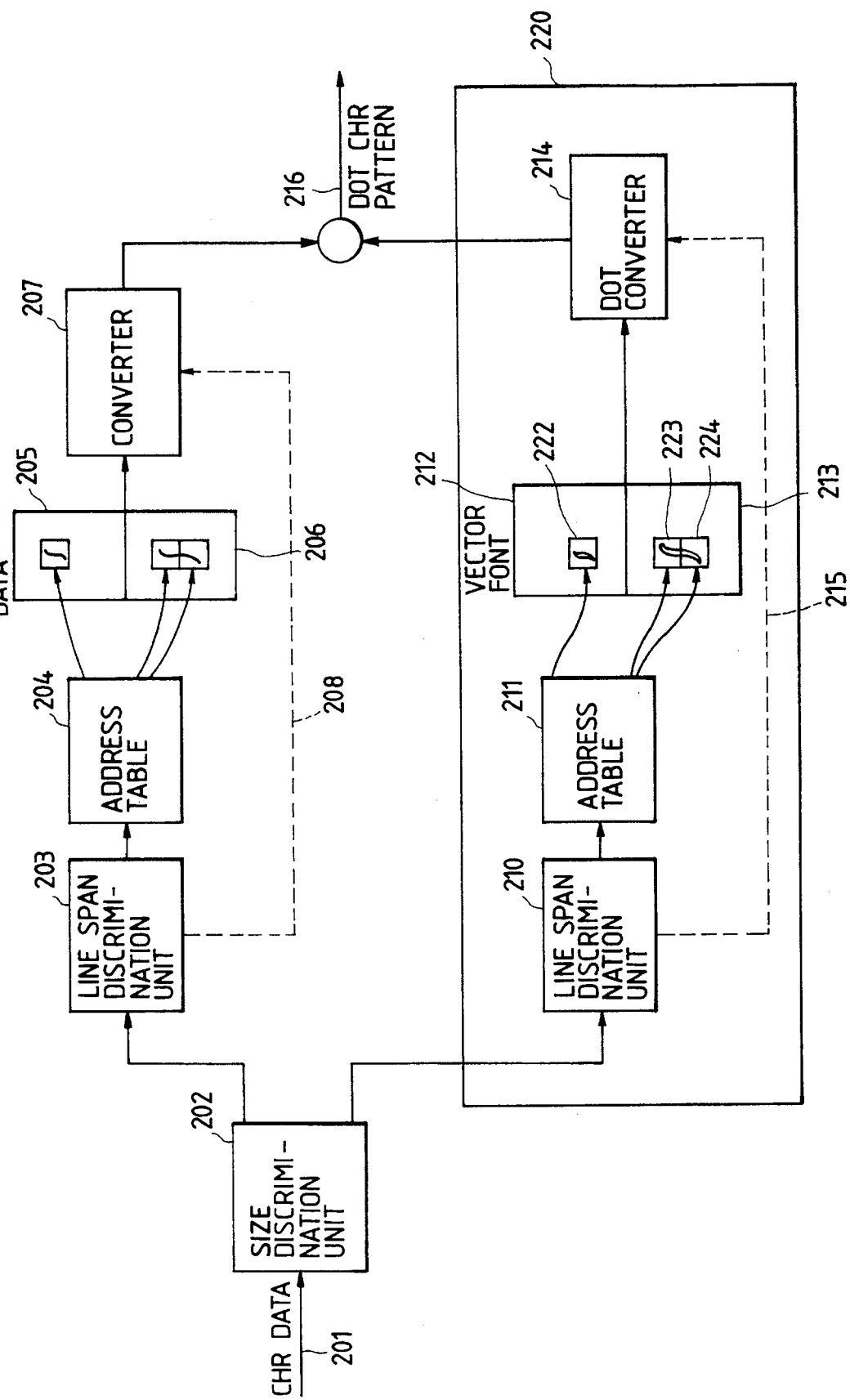
FIG. 2 is a block diagram for explaining a pattern development process in the document processing apparatus.

FIG. 2 is a block diagram showing a pattern development process of a character code. The functional flow in FIG. 2 can be executed by software (program) or hardware. This applies to all embodiments of the present invention.

Input character data 201 include a character code, a character size, data (to be referred to as line span data hereinafter) representing the number of lines of the corresponding character displayed and output (including printing). A size discrimination unit 202 switches subsequent processes in accordance with a character size. For example, when character size data representing a character size of 16 point or more is input, a vector font is used to generate a character pattern. However, when character size data representing a character size of less than 16 point is input, a dot pattern is used to generate a character pattern.

A block 220 is a main part of pattern development by using vector fonts, while the upper part in FIG. 2 represents a process flow for generating a character pattern by using dot pattern data.

At the time of pattern development, a line span discrimination unit 210 determines the number of lines of a character represented by the input character code. The operation of the line span discrimination unit 210 is basically the same as that of a line span discrimination unit 203. If a character can be displayed within one line, an address table 211 converts font data of a vector font 212 into dot data in accordance with the line data from the line span discrimination unit 210. However, when a character extends across a plurality of lines, the address table 211 develops the font data of a vector font 213 into a pattern.

Font data 222 of the vector font 212 represents an integral symbol "∫". Font data 223 of the vector font 213 represents the upper half of the integral symbol "∫", and font data 224 of the vector font 213 represents the lower half of the integral symbol "∫". These font data 222 to 224 have the same size. However, the font data 222 to 224 may have different sizes.

Figure 3:
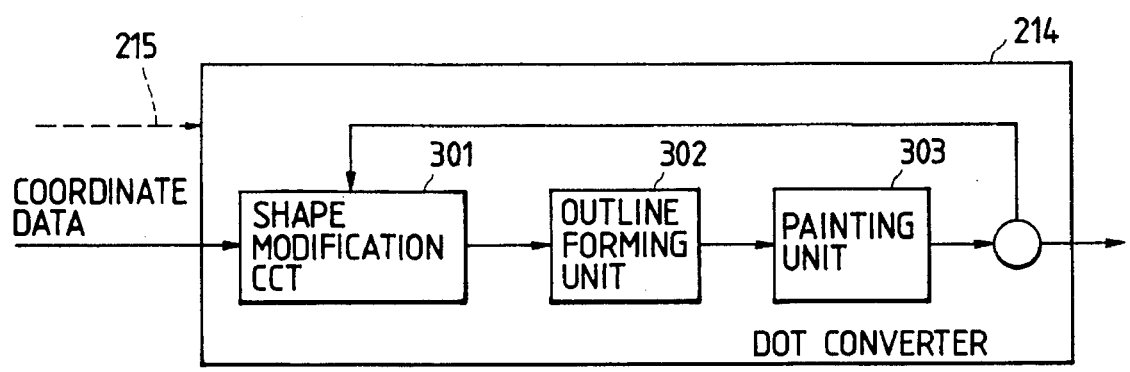
FIG. 3 is a block diagram showing a schematic arrangement of a dot converter shown in FIG. 2.

When a character code of the integral symbol is input and the line span discrimination unit 210 discriminates that the symbol "∫" can be displayed and output within one line, the font data 222 of the vector font 212 is referred to by the address table 211 and is then read out. However, when the line span discrimination unit 210 discriminates that a character extends across a plurality of lines, e.g., two lines, the font data 223 and 224 are referred to by the address table 211 and are then read out. The readout font data are synthesized. Alternatively, the readout font data are converted from vector font data to dot image data by a dot converter 214 (its detailed arrangement is shown in FIG. 3). After the dot image data are then synthesized, the synthesized dot image data is output as a dot character pattern.

If a character size is less than 16 point, the character code is sent to the line span discrimination unit 203. The line span discrimination unit 203 determines the number of lines across which the character extends. If the character can be displayed within one line, pattern data as dot pattern data 205 is read out in accordance with the address table 204. However, if a character extends across a plurality of lines, a plurality of corresponding divided dot patterns are extracted from dot pattern data 206. As in the vector fonts 212 and 213, the pattern data as the dot pattern data 205 represents a dot pattern of the entire integral symbol "∫", and the pattern data as the dot pattern data 206 are pattern data of the upper and lower halves of the integral symbol "∫" in the same size as the pattern size of the dot pattern data. A converter 207 performs size conversion of the readout dot pattern data in accordance with a line span count.

[Description of Dot Converter 214 (FIG. 3)]

FIG. 3 is a block diagram showing a schematic arrangement of the dot converter 214 of this embodiment.

The dot converter 214 receives coordinate data constituting a vector font and causes a shape modification circuit 301 to perform affine transform as needed. The converted coordinate data is supplied to an outline forming unit 302. The outline forming unit 302 generates outline data of a character or the like. Outlines are constituted by closed loops. A painting unit 303 paints an area inside the outline data. For example, painting can be performed by the same process as in a PAINT instruction in the BASIC language.

[Outline Data (FIG. 4)]

Figure 4:
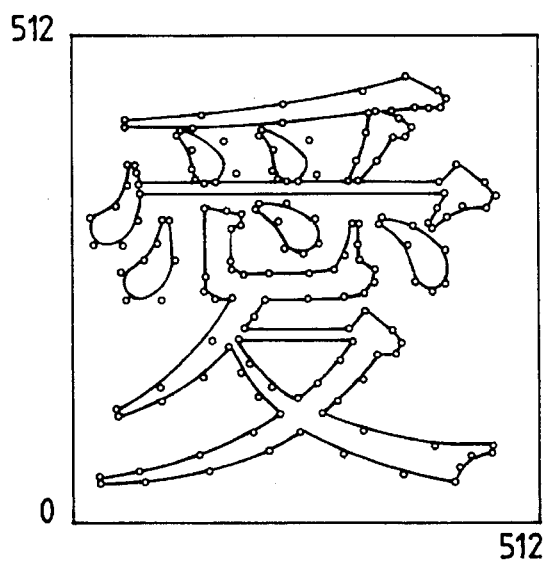
FIG. 4 is a view showing sample points of a character according to a B-spline scheme.

FIG. 4 shows outline data consisting of points obtained by sampling a Chinese character "愛" (reads "ai" and means "love") according to the B-spline scheme.

Referring to FIG. 4, the sample points are represented by small dots, and 512×512 dots are located within a matrix. Each outline data is constituted by a closed loop. According to the B-spline scheme, a spline is generated within an area defined by a sample point as a vertex and start and end points of a given curved interval as base points.

[Vector Font Data (FIG. 5)]

FIG. 5 shows one-character vector font data developed by the B-spline scheme.

A control data area 50 stores retrieval data corresponding to JIS codes, vector font data sizes, outline width correction data, and the like. Sample data areas 51 and 52 store coordinate values and attribute flags of the sample points. An attribute flag 53 represents that a sample point (0,0) represented by the sample data area 51 is a start point. An attribute flag 54 represents that a sample point (30,0) represented by the sample data area 52 represents a curved interval. In this manner, the attribute flags store data representing end and start points of the curved interval or a straight line interval.

[Description of Address Table (FIGS. 6 & 7)]

FIGS. 6 and 7 are views showing contents of the address tables 104 and 105. The address table 104 is used to address vector font data in the font memory 106, and the address table 105 is used to address the vector font address stored in the font memory 107.

In either table, a management table stores the date of creation of font data, a file size of the font data, a start address of the font data, and the like. 2-byte font data addresses corresponding to the JIS codes are stored in an address area 60 of the address table 104. Font addresses of the plurality of divided font data corresponding to one character or symbol, e.g., font data 223 and 224 in FIG. 2, are stored in an address area 61 of the address table 105 in correspondence with one JIS code.

[Description of Pattern Development (FIGS. 1 & 8)]

Figure 8:
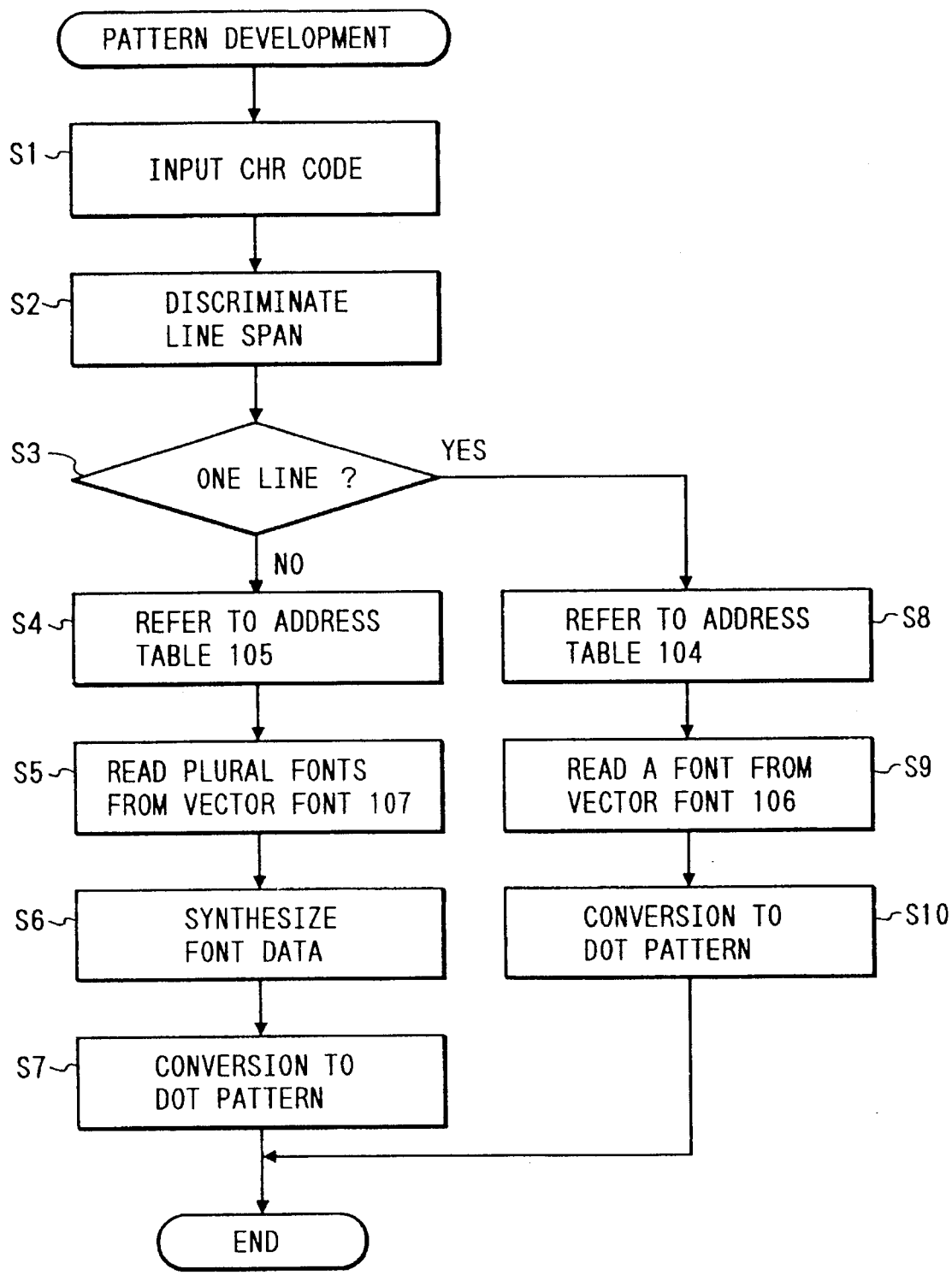
FIG. 8 is a flow chart showing a pattern development process in the document processing apparatus shown in FIG. 1.

FIG. 8 is a flow chart showing a pattern development process by the controller 100 in the document processing apparatus of this embodiment. The control program for executing this process is stored in the ROM 102 in the controller 100.

This program runs in response to a character code input. The character code may be input from the keyboard 112 or the like, or a character code of one character may be read out from a document buffer or the one line in the RAM 103. A character code is input in step S1, and line span discrimination is performed in step S2. The flow advances to step S3 to determine whether a character represented by the character code can be developed within one line or extends across a plurality of lines.

If the character extends across the plurality of lines, the flow advances to step S4. In step S4, the address table 105 is referred to, and a plurality of vector font data of the font memory 107 are addressed. In step S5, the plurality of addressed font data are read out from the font memory 107. In step S6, the plural vector fonts read out from the font memory 107 are synthesized. In step S7, the synthesized vector font is developed into a dot pattern. The dot pattern is then stored in the image memory 116.

If the character represented by character code is determined in step S3 to be displayed or printed within one line, the flow advances to step S8. Font data of the font memory 106 is addressed by the address table 104. In step S9, one-character pattern data is read out from the font memory 106. In step S10, the character pattern is converted into a dot pattern. The converted dot pattern is stored in the image memory 116. The pattern data stored in the image memory 116 is output and printed or is stored in the video memory 111. The data stored in the video memory 111 is read out and displayed on the CRT display 110.

According to this embodiment as described above, plural vector fonts of a divided character in units of lines are stored. When a pattern such as a character must be printed and displayed, extending across a plurality of lines, the plurality of divided patterns are synthesized, and the synthesized pattern is converted into a dot pattern, thereby easily generating the dot pattern.

Furthermore, the vector font data developed into a pattern extending across a plurality of lines is constituted by vector fonts in units of lines. Therefore, the vector font data can be processed as in a normal character font, thereby facilitating document data processing.

According to this embodiment as described above, when a character pattern is developed across a plurality of lines, the divided font data stored in the font memory are selectively synthesized to easily develop a vector font across a plurality of lines with high quality.

Embodiment for Eliminating Common Line in Vector Data Synthesis

[Description of Document Processing Apparatus (FIG. 9)]

Figure 9:
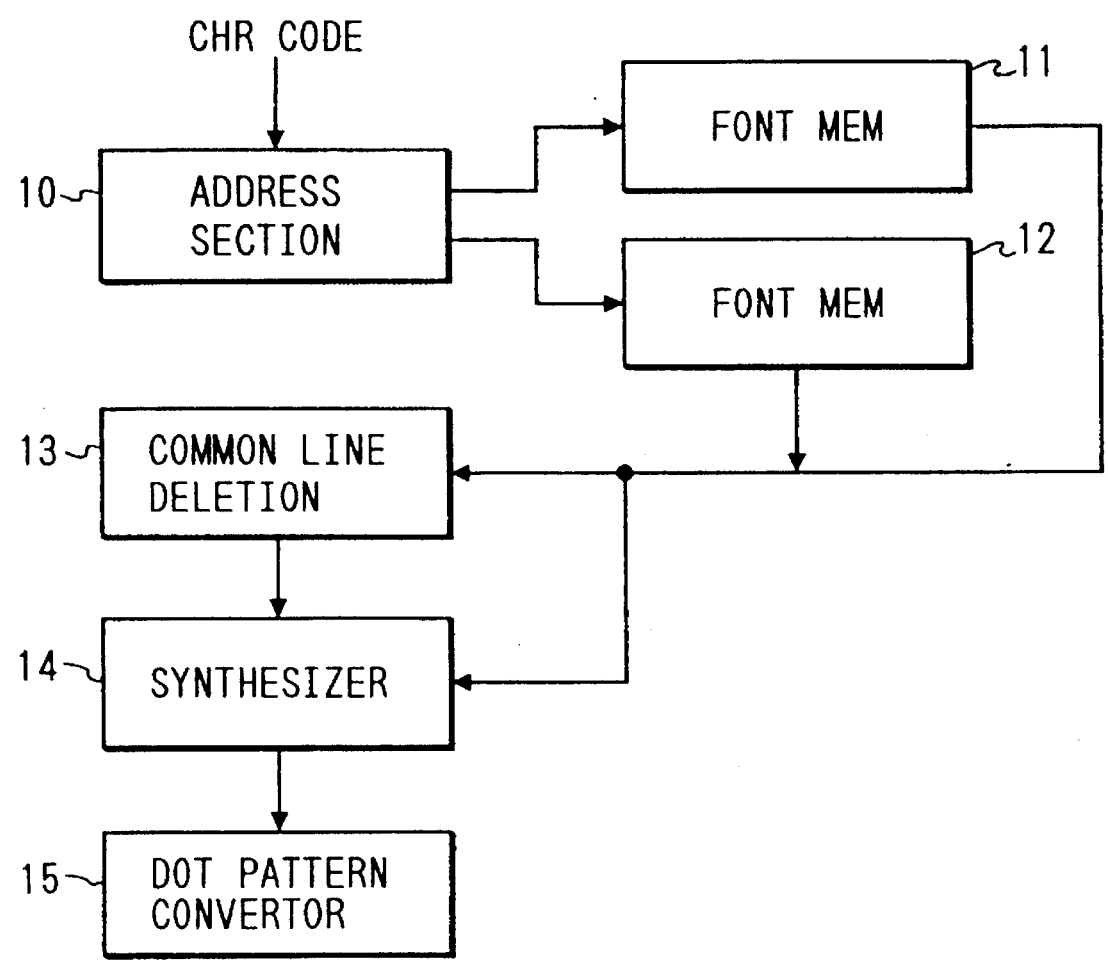
FIG. 9 is a functional block diagram for deleting a common line in vector data synthesis according to another embodiment of the present invention.

FIG. 9 is a functional block diagram showing a document processing apparatus according to another embodiment of the present invention.

Referring to FIG. 9, an address section 10 designates a font address of a font memory 11 for storing pattern data when a corresponding character code is input to the document processing apparatus. The font memory 11 and a font memory 12 store vector font data. When a plurality of font data are present corresponding to one character code (e.g., a multiline span mode to be described later), the font memories 11 and 12 are addressed by the address section 10. A common line deletion section 13 performs read access of the font memories 11 and 12, checks font data, and deletes a common outline. A synthesizer 14 synthesizes font data read out from the font memories 11 and 12 and generates d vector font corresponding to the input character code. A dot pattern converter 15 converts the vector font synthesized by the synthesizer 14 into dot pattern data. A detailed arrangement of the dot pattern converter 15 is substantially the same as that in FIG. 1.

FIG. 10 shows vector font data of an upper half 60 and a lower half 61 of an integral symbol "∫" developed by a B-spline scheme.

A closed loop which surrounds a hatched portion 64 of the upper half 60 represents the upper vector font data of the integral symbol. A closed loop which surrounds a hatched portion 65 of the lower half 61 represents lower vector font data of the integral symbol. Line segments 62 and 63 are common vector font portions. When two font data are to be synthesized, these line segment portions are deleted by e.g., an exclusive OR operation, so that the hatched portions 64 and 65 are synthesized.

FIG. 11 is a table showing vector font data of the hatched portion 64 of FIG. 10 as in FIG. 5. A control data area 50 stores JIS codes, vector font data sizes, and outline data. Sample data areas 71 to 73 store coordinate values and attribute flags of the sample points. More specifically, the sample data area 71 stores coordinate values of a point 66 in FIG. 10, the sample data area 72 stores coordinate values of a sample point 67, the sample data area 73 stores coordinate values of a sample point 68, and a sample data area 74 stores coordinate values of a last sample point 69. An attribute flag 53 stores characteristics of each sample point. That is, a flag 54 represents that the sample point 66 is a start point. A flag 55 represents that the sample point 66 is the common coordinate (sample) point with the other vector font. According to the exclusive OR operation described above, the points 66 and 69 are converted into hollow points. Therefore, the solid points must be converted into hollow dots prior to the exclusive OR operation, or the hollow points must be painted after the exclusive OR operations.

Data 56 of the attribute flag 53 represents that the sample point 67 in FIG. 10 is a curved interval. The attribute flag 53 stores data representing a terminal point, a start point, an end point, or a straight line interval, and data representing that the terminal point is common with another vector font.

[Description of Pattern Development (Elimination of Common Line) (FIG. 12)]

Figure 12:
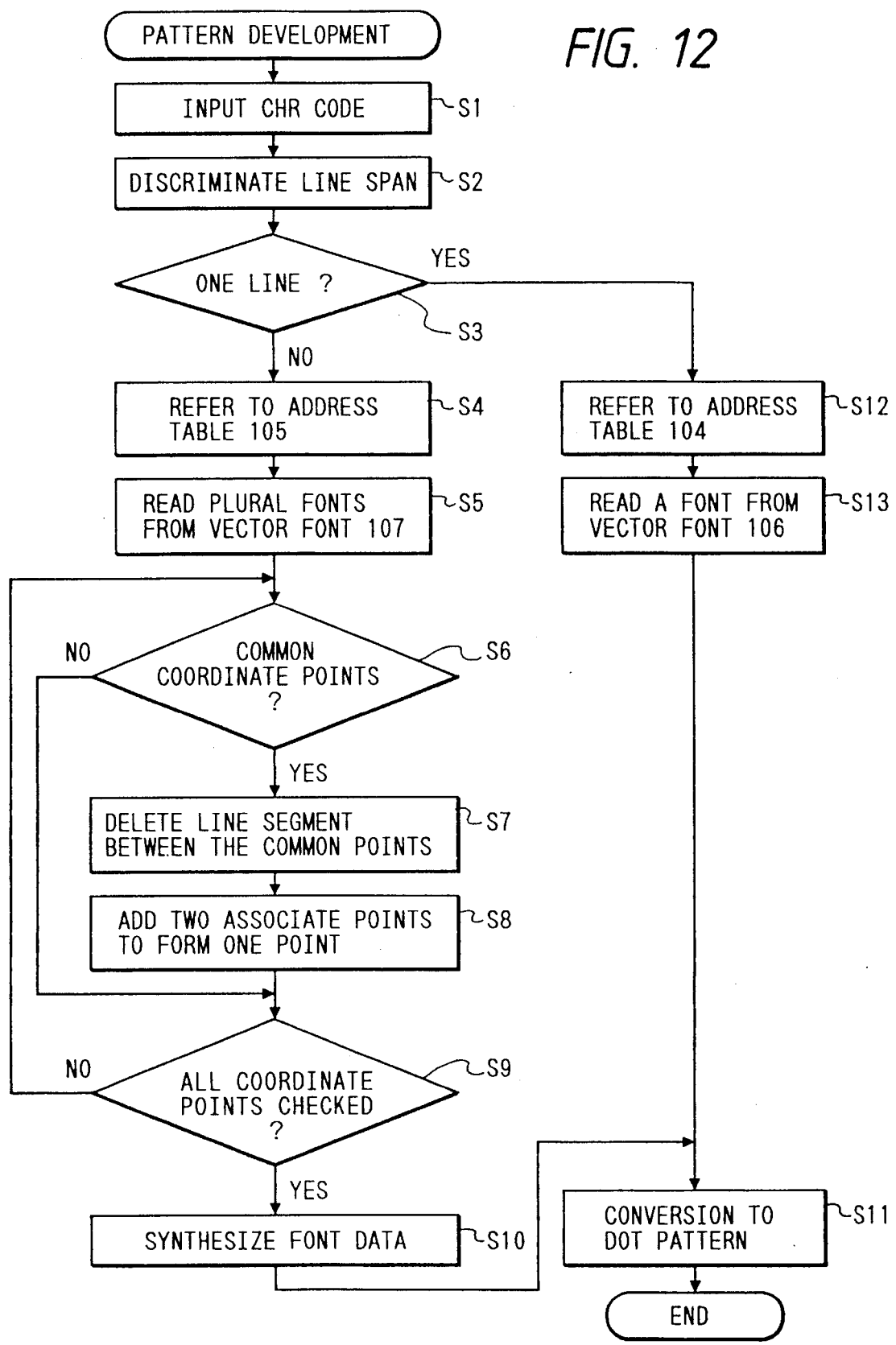
FIG. 12 is a flow chart for explaining a pattern development process including a common line elimination process.

FIG. 12 is a flow chart showing pattern development by a controller 100 of the document processing apparatus of this embodiment. A control program of a CPU 101 which performs this processing is stored in a ROM 102 of the controller 100.

This program runs in response to a character code input. The character code may be input from a keyboard 112 or the like, or a character code of one character may be read out from a document buffer or the line in a RAM 103. A character code is input in step S1, and line span discrimination is performed in step S2. The flow advances to step S3 to determine whether a character represented by the character code can be developed within one line or extends across a plurality of lines.

If the character extends across the plurality of lines, the flow advances to step S4. In step S4, an address table 105 is referred to, and a plurality of vector font data of a font memory 107 are addressed. In step S5, the plurality of addressed font data are read out from the font memory 107 and stored in the RAM 103.

In step S6, the attribute flags (FIG. 11) of the coordinate points of the plural vector fonts read out from the font memory 107 are checked to determine if the coordinate points coincide ride with coordinate points of vector fonts to the synthesized. This can be easily performed by checking the attribute flags 53, as described above. If a coincidence is detected, the flow advances to step S7, and a line segment which connects the coinciding points is deleted. For example, in FIG. 11, the attribute flag of the data 74 representing the sample point 69 in FIG. 10 is changed to a flag representing an end point of a closed loop, so that the vector font of the hatched portion 64 in FIG. 10 is no longer constituted by a closed loop, and the line segment 62 is thus deleted. In this case, in order to prevent the pellets 66 and 69 from being displayed or printed as hollow dots, the points are painted, as previously described.

Figure 13:
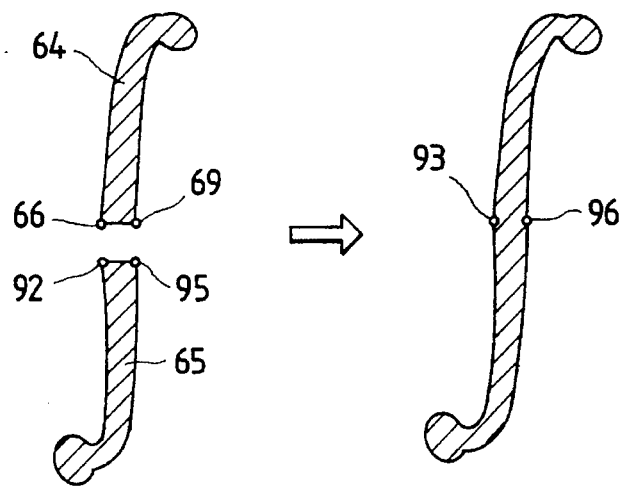
FIG. 13 is a view for explaining synthesis of common coordinate points of vector font data.

After the line segment portion is deleted, the flow advances to step S8. The common coordinate point detected in step S6 and the coinciding coordinate point of the corresponding font data are converted into one coordinate point, as shown in FIG. 13. For example, the point 66 and a point 92 are converted into one point 93, and the point 69 and a point 95 are converted into one point 96. In this case, when the vector font data of the hatched portion 64 is used as reference data, the vector font data of the hatched portion 65 becomes font data biased by 512 dots in the Y direction. It is determined in step S9 whether all the coordinate points are checked. If NO in step S9, the flow returns to step S6. Otherwise, the flow advances to step S10 to synthesize the font data as shown in FIG. 13. In step S11, the synthesized vector font is developed into a clot pattern. The dot pattern is stored in an image memory 116.

When a character represented by the character pattern is determined in step S3 to be displayed or printed within one line, the flow advances to step S12. The font data stored in a font memory 106 are addressed on the address table 104. In step S13, one-character pattern data is then read out from the font memory 106. The character pattern is then converted into a dot pattern in step S11. The dot pattern is then stored in the image memory 116. The pattern data stored in the image memory 116 is output to a printer 114, or stored in a video memory 111 and then read out and displayed on a CRT display 110.

According to this embodiment described above, a plurality of divided vector fonts constituting a character or the like in units of lines are stored. When a pattern representing a character or the like is printed or displayed, extending across a plurality of lines, the plurality of divided patterns are synthesized, and the synthesized pattern is converted into a dot pattern, thereby easily generating the dot pattern.

In pattern synthesis, common line segments of the vector fonts are deleted to eliminate unnecessary boundary lines between the vector fonts. Therefore, character painting and its reversal can be easily performed.

According to this embodiment as described above, the plural vector fonts are synthesized to generate a character or symbol. The common outlines of the vector fonts are deleted, and outline data for the character or symbol is generated. Therefore, the pattern can easily be developed into a dot pattern.

Registration of Synthesized Vector Font Data

[Description of Function of Document Processing Apparatus (FIG. 14)]

Figure 14:
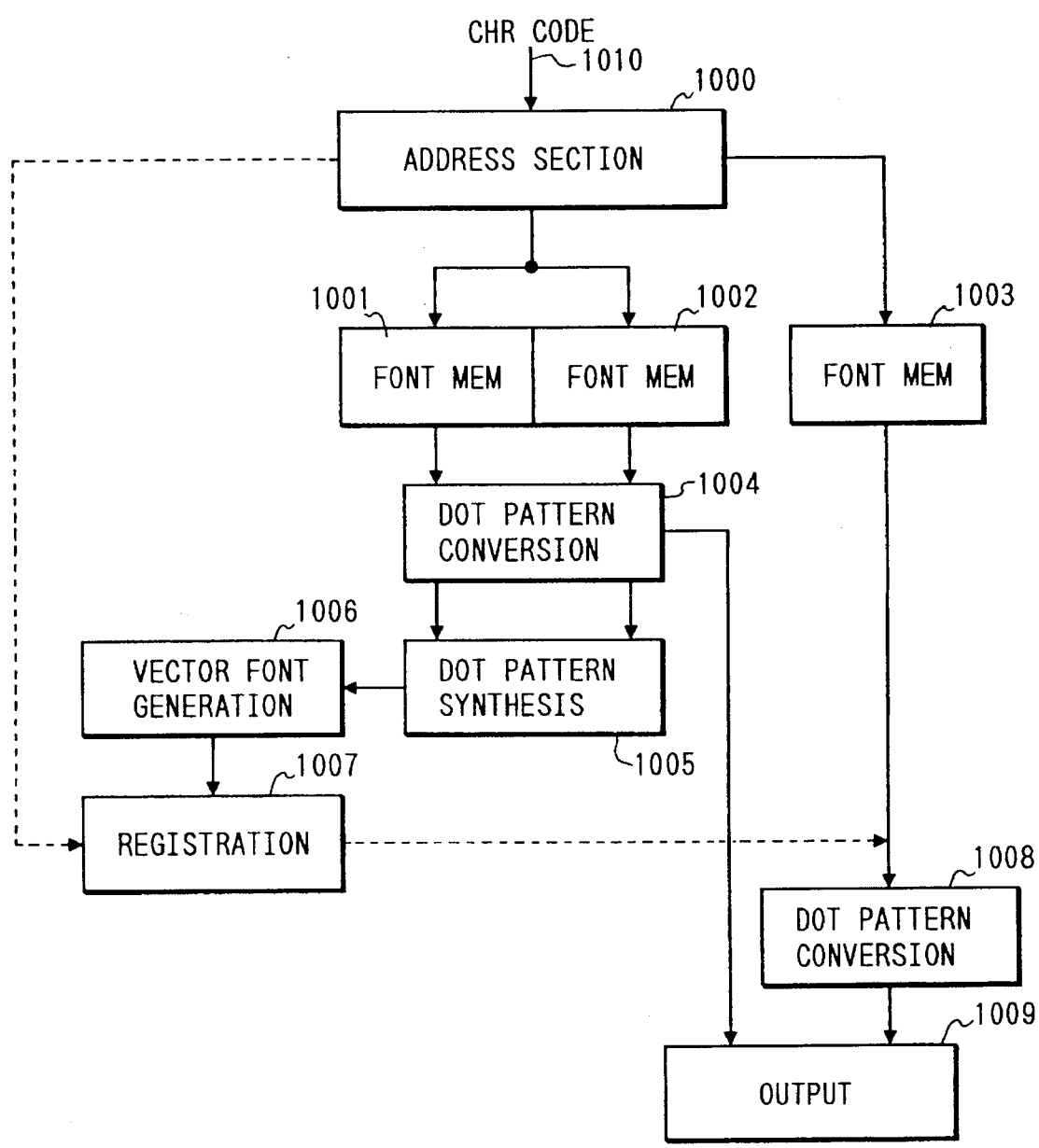
FIG. 14 is a view for explaining a function of registration of synthesized vector font data.

FIG. 14 is a functional block diagram of a document processing apparatus according to still another embodiment of the present invention.

Referring to FIG. 14, an address section 1000 designates font addresses of font memories 1001 to 1003 for storing the corresponding pattern data when a character code 1010 is input. When a plurality of font data are present in correspondence with one character code (i.e., a multiline span mode to be described later), the font memories 1001 and 1003 are simultaneously addressed by the address section 1000. However, if a one-to-one correspondence is established between the character code and the vector font, only the font memory 1003 is accessed.

A dot pattern conversion section 1004 accesses the font memories 1001 and 1002 to read out font data and develops the readout font data into a dot pattern. A dot pattern synthesis section 1005 synthesizes these dot patterns and generates a dot pattern corresponding to the input character code 1010. A dot pattern generation section 1006 generates a vector font corresponding to the input character code 1010 on the basis of the dot pattern synthesized by the dot pattern synthesis section. A registration section 1007 registers a vector font in correspondence with the character code 1010. Once the vector font is registered in the registration section 1007, it can be directly accessed by the character code 1010 input from the address section 1000.

A dot pattern conversion section 1008 reads out font data from the font memory 1003 and develops the font data into a dot pattern. The dot pattern conversion section 1008 receives vector font data upon direct access of the registration section 1007 by the address section 1000 and converts the vector font data into dot pattern data. An output section 1009 receives pattern data from the dot pattern conversion section 1004 or 1008 and outputs it to a CRT display or printer.

[Description of Document Processing Apparatus (FIG. 15)]

Figure 15:
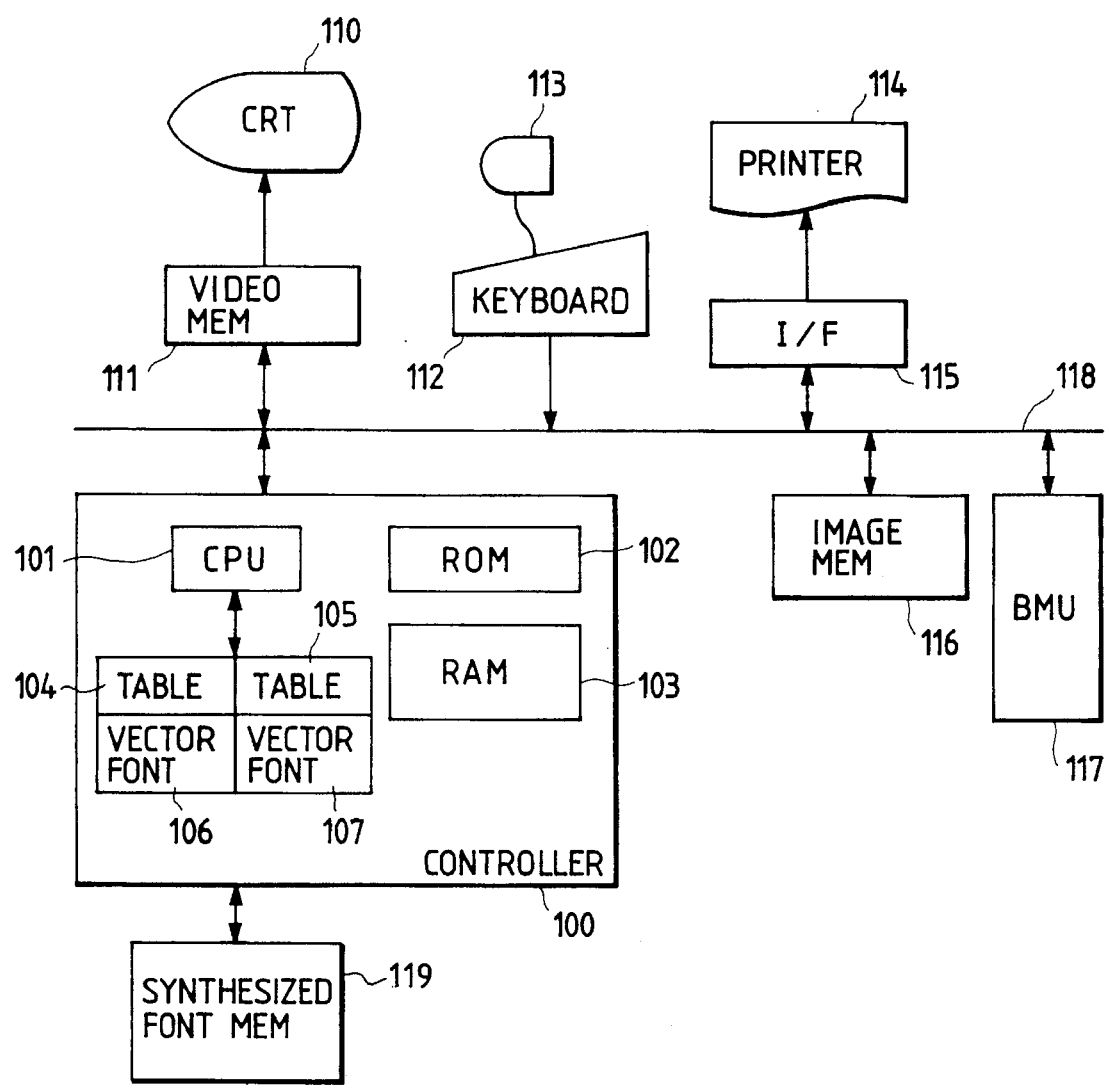
FIG. 15 is a block diagram for executing the process of FIG. 14 according to still another embodiment of the present invention.

FIG. 15 is a block diagram showing a schematic arrangement of the document processing apparatus of this embodiment. The same reference numerals as in FIG. 1 denote the same parts in FIG. 15.

Referring to FIG. 15, a controller 100 for controlling the overall operation of the document processing apparatus includes a CPU 101 such as a microcomputer, a ROM 102 storing control programs shown in flow charts in FIGS. 17 and 19 and various data, and a RAM 103 serving as a work area of the CPU 101 to temporarily store various data, the input document data, the readout vector fonts, and the pattern-developed dot pattern data. The controller 100 also includes address tables 104 and 105 for storing addresses of font data in correspondence with sizes of character patterns. The table 104 is used to refer to font data of a normal character size (within one line), and the table 105 stores the addresses for reading out font data of a large character size (extending across a plurality of lines).

The controller 100 further includes font memories 106 and 107 for storing font data of characters or the like in the form of vector fonts. The font memory 106 stores the font data of a normal character size, and the font memory 107 stores the font data of a large size extending across a plurality of lines (to be described later). The font data of a large size is divided into pieces each having the same font size as that of line font data of the normal character size stored in the font memory 106, and the divided data are stored in the font memory 107. Therefore, the address table 105 addresses a plurality of font data from the font memory 107. Dot pattern data is generated on the basis of the plurality of these font data.

A CRT display 110 displays an image corresponding to dot information stored in a video memory 111 as well as input document data, messages to an operator, and control data. A keyboard 112 is used to input document data and control data entered by the operator. A pointing device 113 such as a mouse causes permits an operator to move a cursor or the like on the CRT display 110, designate a command image such as an icon so as to input a command, and designate a coordinate position on the screen. A printer 114 comprises, e.g., a laser beam printer. An interface (I/F) 115 performs interface control between the printer 114 and the controller 100. An image memory 116 stores image data representing characters of the like. Image data is read out from the image memory 116 in response to an instruction output from the keyboard 112 or the pointing device 113, and the readout image data is output to and printed at the printer 114.

A bit manipulation, unit (BMU) 117 is used as a pattern developing means or pattern modifying means in this embodiment. When a modification interval of any character string developed and dislayed on the CRT display 110 and character modification data for the character string are input by the pointing device 113, display data corresponding to the characters within the designated interval are modified and developed. Unlike in FIG. 1, a synthesized font memory 119 converts a plurality of font data read out from the font memory 107 for one character code into dot pattern data, synthesizes the dot pattern data, converts the synthesized dot pattern data into one vector font data, and stores the resultant vector font data. After the vector font data is registered, the vector font data stored in the font memory 119 can be directly accessed in response to an input character code. A dot pattern is generated on the basis of the accessed font data.

[Description of Pattern Development (FIG. 16)]

FIG. 16 is a block diagram showing a pattern development process of a character code. The same reference numerals as in FIG. 2 denote the same parts in FIG. 16.

Input character data 201 include a character code, a character size, data (to be referred to as line span data hereinafter) representing the number of lines of the corresponding character displayed and output (including printing). A size discrimination unit 202 switches subsequent processes in accordance with a character size. For example, when character size data representing a character size of 16 point or more is input, a vector font is used to generate a character pattern. However, when character size data representing a character size of less than 16 point is input, a dot pattern in the upper half is used to generate a character pattern.

A block 220 is a part of pattern development by using vector fonts, while the upper part in FIG. 16 represents a process flow for generating a character pattern by using dot pattern data. A description of the block 220 will be concentrated provided below.

At the time of pattern development, a line span discrimination unit 210 determines the number of lines of a character represented by the input character code. The operation of the line span discrimination unit 210 is basically the same as that of a line span discrimination unit 203. An address table 211 corresponds to the address tables 104 and 105 in FIG. 15. If a character can be displayed within one line, the address table 211 converts font data of a vector font read out from the font memory 106 into dot data in accordance with the line data from the line span discrimination unit 210. However, when a character extends across a plurality of lines, the address table 211 develops the font data of a vector font read out from the font memory 107 into a pattern.

Font data 222 of the vector font read out from the font memory 106 represents an integral symbol "∫". Font data 223 of the vector font represents the upper half of the integral symbol "∫", and font data 224 of the vector font represents the lower half of the integral symbol "∫".

When a character code of the integral symbol is input and the line span discrimination unit 210 discriminates that the symbol "∫" can be displayed and output within one line, the font data 222 of the vector font read out from the font memory 106 is referred to by the address table 211 and is then read out. However, when the line span discrimination unit 210 discriminates that a character extends across a plurality of lines, e.g., two lines, the font data 223 and 224 are referred to by the address table 211 and are then read out. The readout vector fonts are input to a dot pattern converter 225 and converted into dot patterns, respectively.

These dot pattern data are synthesized by a synthesizer 226 into one character pattern. The corresponding vector font is generated by a vector font generator 227. A dot pattern converter 228 receives the vector font from the font memory 106 and develops it into a dot pattern. The font data generated by the dot pattern converter 228 or synthesized by the synthesizer 226 is output as a dot character pattern 216. The vector font generated by the vector font generator 227 is stored in the font memory 119 correspondence with the character code and line span data from the line span discrimination unit 210. Therefore, when identical code data or identical line span data is input from the line span discrimination unit 210 to the font memory 119, the font memory 119 reads out the corresponding font data. The readout data is output to the dot pattern converter 228 and is converted into dot pattern data. The converted data is then output.

The arrangement of the dot pattern converter 228 is the same as that in FIG. 3. The dot pattern converter 225 has an arrangement including parallel dot pattern converters 214 shown in FIG. 3.

If a character size is less than 16 point, the character code is sent to the line span discrimination unit 203. The line span discrimination unit 203 determines the number of lines across which the character extends. If the character can be displayed within one line, pattern data as dot pattern data 205 is read out in accordance with the address table 204. However, if a character extends across a plurality of lines, a plurality, of corresponding divided dot patterns are extracted from dot pattern data 206. As in the vector fonts read out from the font memories 106 and 107, the pattern, data as the dot pattern data 205 represents a dot pattern of the whole integral symbol "∫", and the pattern data as the dot pattern data 206 are pattern data of upper and lower halves of the integral symbol "∫". A converter 207 performs size conversion of the readout dot pattern data in accordance with a line span count.

FIGS. 6 and 7 show the contents of the address tables 104 and 105 and apply to this embodiment.

Referring to FIGS. 6 and 7, in either table, a management table stores the date of creation of font data, a file size of the font data, a start address of the font data, and the like. 2-byte font data addresses corresponding to the JIS codes are stored in an address area 60 of the address table 104. Font addresses of the plurality of divided font data corresponding to one character or symbol, e.g., font data 223 and 224 in FIG. 16, are stored in an address area 61 of the address table 105 in correspondence with one JIS code.

FIG. 11 shows one-character vector font data developed by the B-spline scheme.

A control data area 50 stores retrieval data corresponding to JIS codes, vector font data sizes, outline width correction data, and the like. Sample data areas 51 and 52 store coordinate values and attribute flags of the sample points. An attribute flag 53 represents that a sample point (0,0) represented by the sample data area 51 is a start point. An attribute flag 54 represents that a sample point (30,0) represented by the sample data area 52 represents a curved interval. In this manner, the attribute flags store data representing end and start points of the curved interval or a straight line interval. [Description of Pattern Development: Plural Vector Data→ Synthesized Vector (Data); Plural Vector Data→Synthesized Vector Data (FIGS. 17 & 18)]

FIG. 17 is a flow chart showing a pattern development process by the controller 100 in the document processing apparatus of this embodiment. The control program for executing this process is stored in the ROM 102 in the controller 100.

This program runs in response to an input character code. The character code may be input from the keyboard 112 or the like, or a character code of one character may be read out from a document buffer or the line in the RAM 103. A character code is input in step S1, and line span discrimination is performed in step S2. The flow advances to step S3 to determine whether a character represented by the character code can be developed within one line or extends across a plurality of lines.

If the character extends across a plurality of lines, the flow advances to step S4. In step S4, the address table 105 is referred to, and a plurality of vector font data of the font memory 107 are addressed. In step S5, the plurality of addressed font data are read out from the font memory 107. In step S6, the plural vector fonts read out from the font memory 107 are converted into dot pattern data. The dot pattern data are then stored in the RAM 103. In step S7, these dot pattern data are synthesized to generate a dot pattern data corresponding to the input character code and the input line span size.

In step S8, a vector font is generated on the basis of this dot pattern data. It is then checked in step S9 whether the generated vector font is registered. If YES in step S9, the flow advances to step S10, and the vector font is registered in the synthesized font memory 119 in correspondence with the character code and the line span data. If an identical character code or identical line span size data is input later, the corresponding vector font is read out from the font memory 119, and the readout vector font can be converted into dot pattern data. In step S11, the dot vector fond data is developed, and the dot pattern developed and synthesized in step S7 can be stored in the image memory 116 or the video memory 111.

Figure 18:
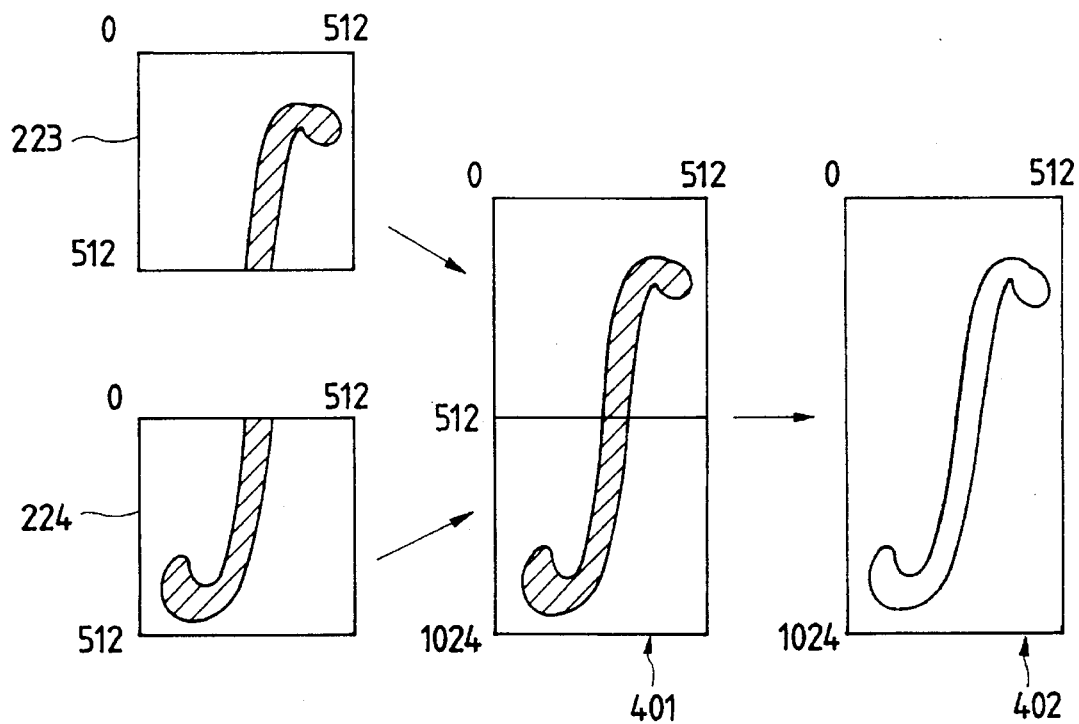
FIG. 18 is a view for explaining a registration process of synthesized vector font data.

FIG. 18 is a view showing pattern synthesis arid conversion of a dot pattern into a vector font.

The upper and lower halves 223 and 224 of the integral symbol are represented by vector font data, respectively. Dot pattern data 401 represents a dot pattern obtained by pattern-developing the vector fonts 223 and 224. Vector font data 402 is generated from the dot pattern data 401. The vector font length is doubled (1024) with respect to the normal vector font size.

When the character is determined in step S3 to be displayed or printed within one line, the flow advances to step S12. Font data of the font memory 106 is addressed by the address table 104. In step S13, one-character pattern data is read out from the font memory 106. In step S14, the readout pattern data is converted into a dot pattern. The dot pattern is stored in the image memory 116. The pattern data stored in the image memory 116 is output and printed at the printer 114, or is stored in the video memory 111 and read out and displayed on the CRT display 110.

According to this embodiment as described above, plural divided vector fonts of a character or the like are stored in units of lines. When a pattern of a character or the like is printed or displayed, extending across a plurality of lines, the plural divided vector fonts are synthesized into a dot pattern. The synthesized dot pattern is converted into a vector font, and therefore pattern processing such as font data painting and its reversal processing can be simplified.

Since the generated vector fonts are registered, the font data can be directly accessed and pattern development can be performed on the basis of the accessed font data in subsequent processing. Pattern processing can therefore be facilitated.

In this embodiment, when plural vector fonts are synthesized, they are converted into dots and then synthesized, and the synthesized dot is converted into one vector font. However, the vector fonts need not be converted into dots for synthesis if coordinate points of the attribute flags (e.g., end point flags) of the vector fonts to be synthesized are detected to be common.

The above operation is shown in FIG. 19. In step S21, the corresponding plural vector fonts are read out. It is checked in step S22 whether the coordinate points are end points. If YES in step S22, the flow advances to step S23 to check if the coordinates coincide with each other. If NO in steps S22 and S23, the flow advances to step S6 or the like in FIG. 9, and the corresponding operation is performed. If YES in steps S22 and S23, the flow advances to step S25, and the vector fonts are synthesized.

According to this embodiment as described above, plural vector fonts are synthesized to generate one vector font corresponding to a character or symbol, and the generated vector font is registered. In a subsequent read access, the registered font data can be directly accessed to perform dot pattern development. Therefore, subsequent pattern development can be facilitated.

Figure 20:
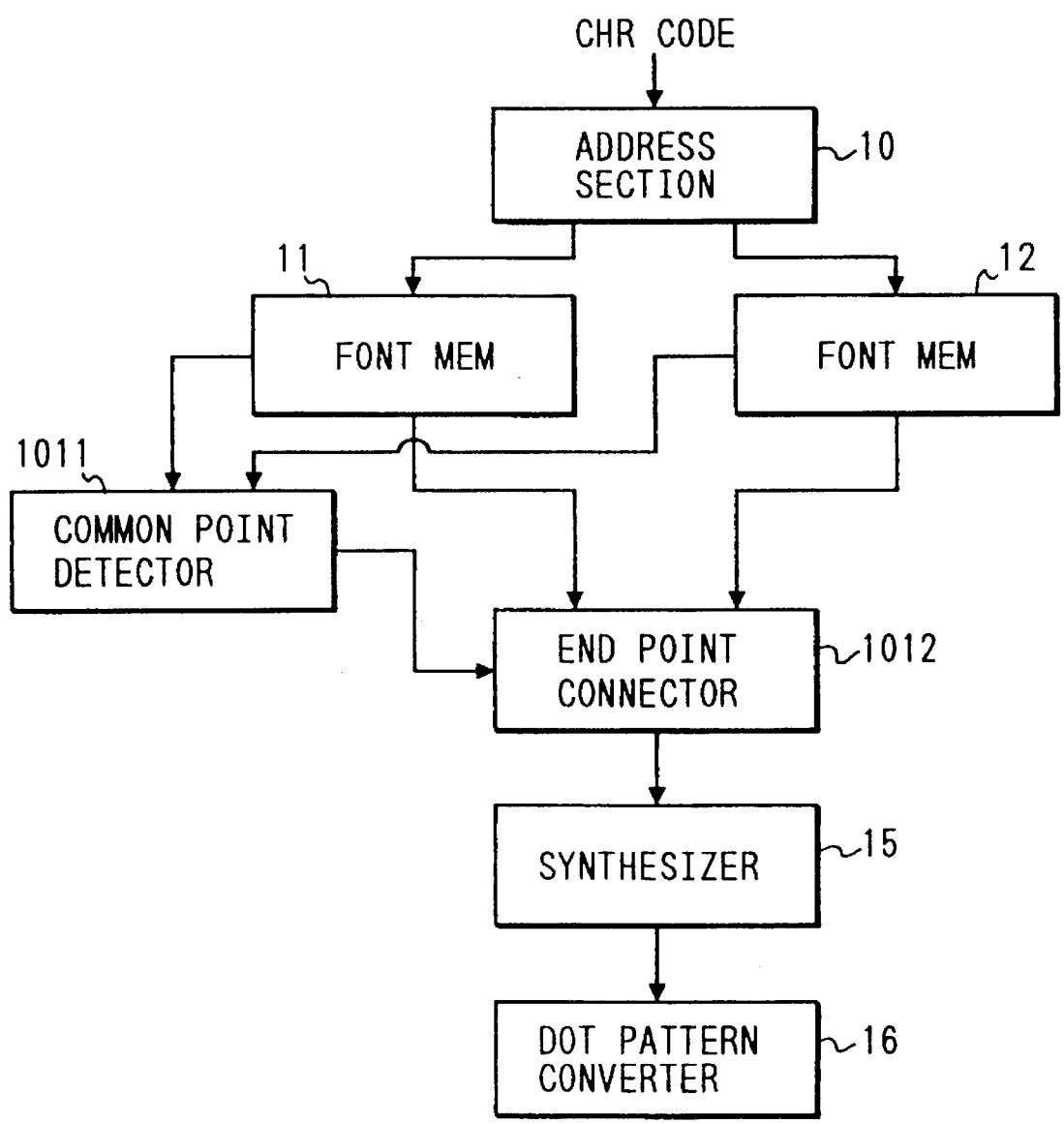
FIG. 20 is a functional block diagram for correlating end points of a plurality of vector data according to still another embodiment of the present invention.

FIG. 20 is a functional block diagram of a document processing apparatus according to still another embodiment of the present invention. The same reference numerals as in FIG. 9 denote the same parts in FIG. 20.

Referring to FIG. 20, an address section 10 designates font addresses of font memories 11 and 12 for storing pattern data corresponding to retrieval codes when a retrieval code such as a character code is input. When a plurality of font data are present for one retrieval code (i.e., a multiline span mode), the font memories 11 and 12 are addressed by the address section 10. An end point detector 1011 reads out the vector font data from the font memories 11 and 12, checks the readout font data, and detects the common end points of the font data.

An end point connector 1012 reads out the font data from the font memories 11 and 12 and connects the end points detected by the common point detector 1011 with a line segment having a length corresponding to the size of the output character pattern. A synthesizer 15 causes the end point connector 1012 to connect the end points of the font data read out from the font memories 11 and 12, synthesizes the font data into one vector font whose end points are connected to each other, and then generates a vector font corresponding to the input character code. A dot pattern converter 16 converts the synthesized vector font into dot pattern data.

A schematic arrangement of the document processing apparatus of this embodiment is substantially the same as that in FIG. 1.

[Description of Pattern Development (FIG. 21)]

Figure 21:
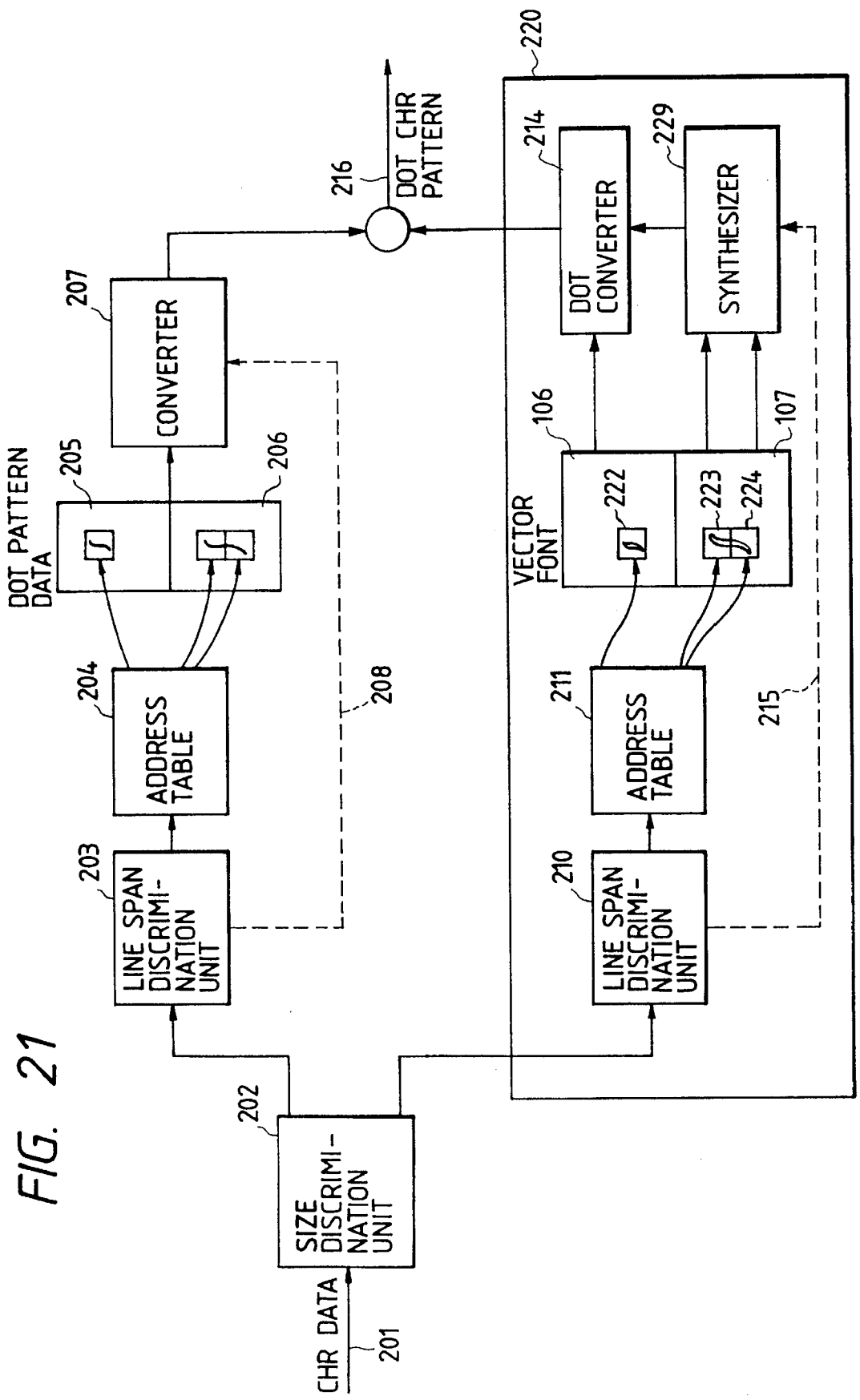
FIG. 21 is a view for explaining a pattern development process.

FIG. 21 is a view for explaining pattern development of a character code in the document processing apparatus of this embodiment. Only parts different from those in FIG. 2 will be described below.

The vector fonts read out from the font memories are synthesized by a synthesizer 229 in accordance with line span data and the synthesized vector font is output to a dot converter 214 and then developed into a dot pattern.

The vector font of the font memory 106 represents font data 222 of the integral symbol "∫". An upper half 223 of the vector font from the font memory 107 represents upper half data of the integral symbol "∫", and a lower half 224 of the vector font from the font memory 107 represents lower half data of the integral symbol "∫".

When a character code representing an integral symbol is input and the line span discrimination unit 210 determines that the symbol "∫" can be displayed and output within one line, the font data 222 is read out from the font memory 106 by the table 104 of the address table 211. However, when the line span discrimination unit 210 determines that the character is displayed, extending across a plurality of lines, e.g., two lines, the font data 223 and 224 are addressed and read out by the table 105 of the address table 211. The readout vector fonts are synthesized into one vector font by the synthesizer 229.

The font data read out or synthesized in this manner is converted into dot image data by the dot converter 214 described in detail with reference to FIG. 3 and is output as a dot character pattern.

[Description of Vector Font Synthesis]

FIG. 4 is a view showing outline data consisting of sample points obtained by sampling a Chinese character "整" by the B-spline scheme, as previously described. The upper half or its data 223 and the lower half or its data 224 of the integral symbol "∫" developed by the B-spline scheme are shown in FIG. 22 identical to FIG. 10.

Figure 22:
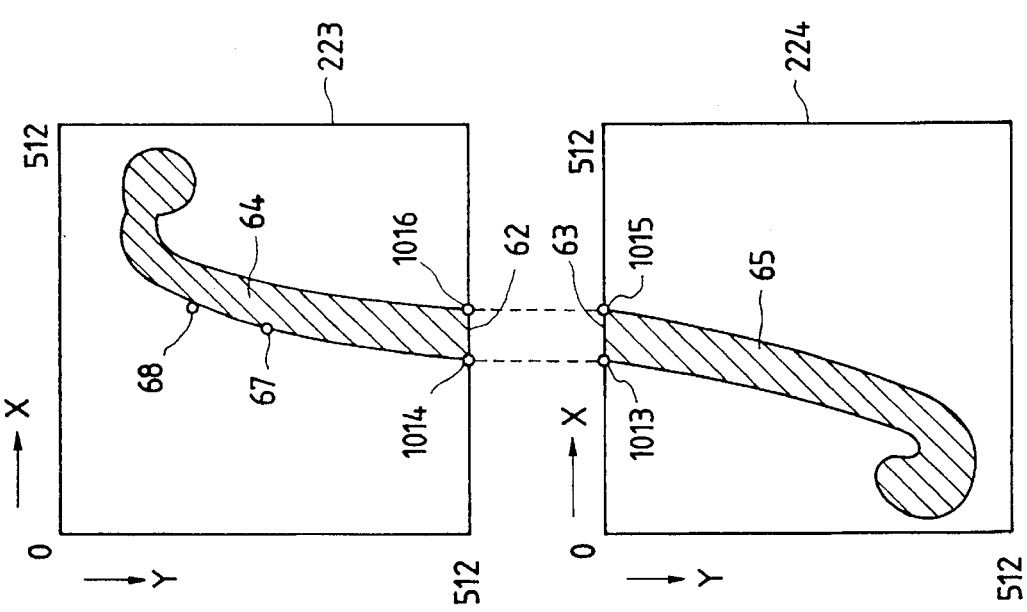
FIG. 22 is a view for explaining a method of correlating the end points of the plurality of vector data.

Referring to FIG. 22, a closed loop which surrounds a hatched portion 64 of the upper half 223 represents vector font data of the upper half of the integral symbol, and a closed loop which surrounds a hatched portion 65 of the lower half 224 represents vector font data of the lower half of the integral symbol. In this case, points 1013 and 1014 and points 1015 and 1016 are common end points. Therefore, in order to synthesize these two font data, a vector font corresponding to a line segment which connects these end points is generated in correspondence with line span data, and a single pattern obtained by combining the vector fonts (223 and 224) is output. Vector font data corresponding to line segments 62 and 63 are deleted. The synthesized vector font can be converted into the dot pattern data as in the normal vector font.

Figure 23:
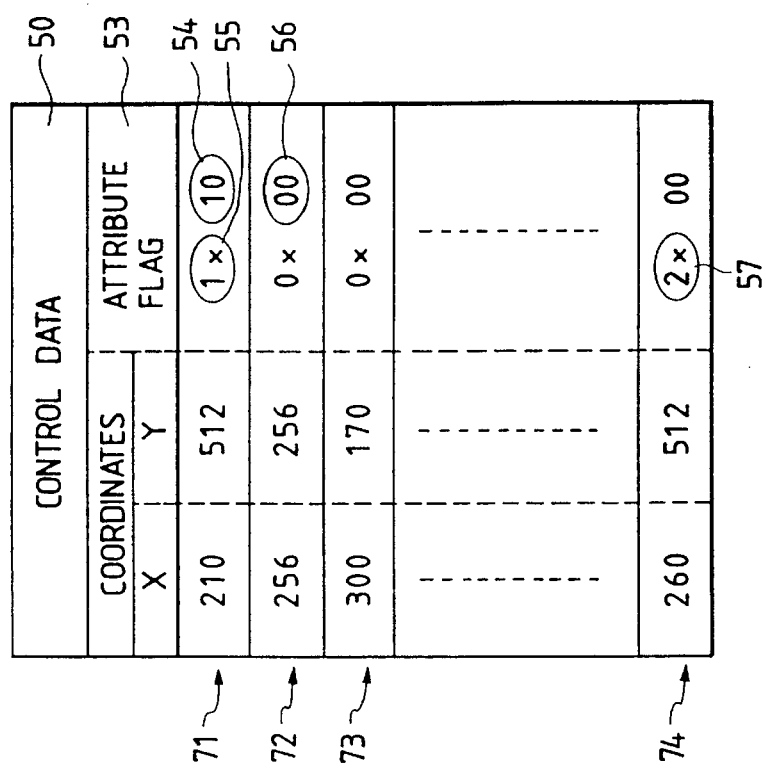
FIG. 23 is a view showing vector font data.

FIG. 23 is a view showing vector font data of the hatched portion 64 as in FIG. 11.

[Description of Pattern Development: Correlation of Common End Points of Plural Vector Data (FIG. 24)]

Figure 24:
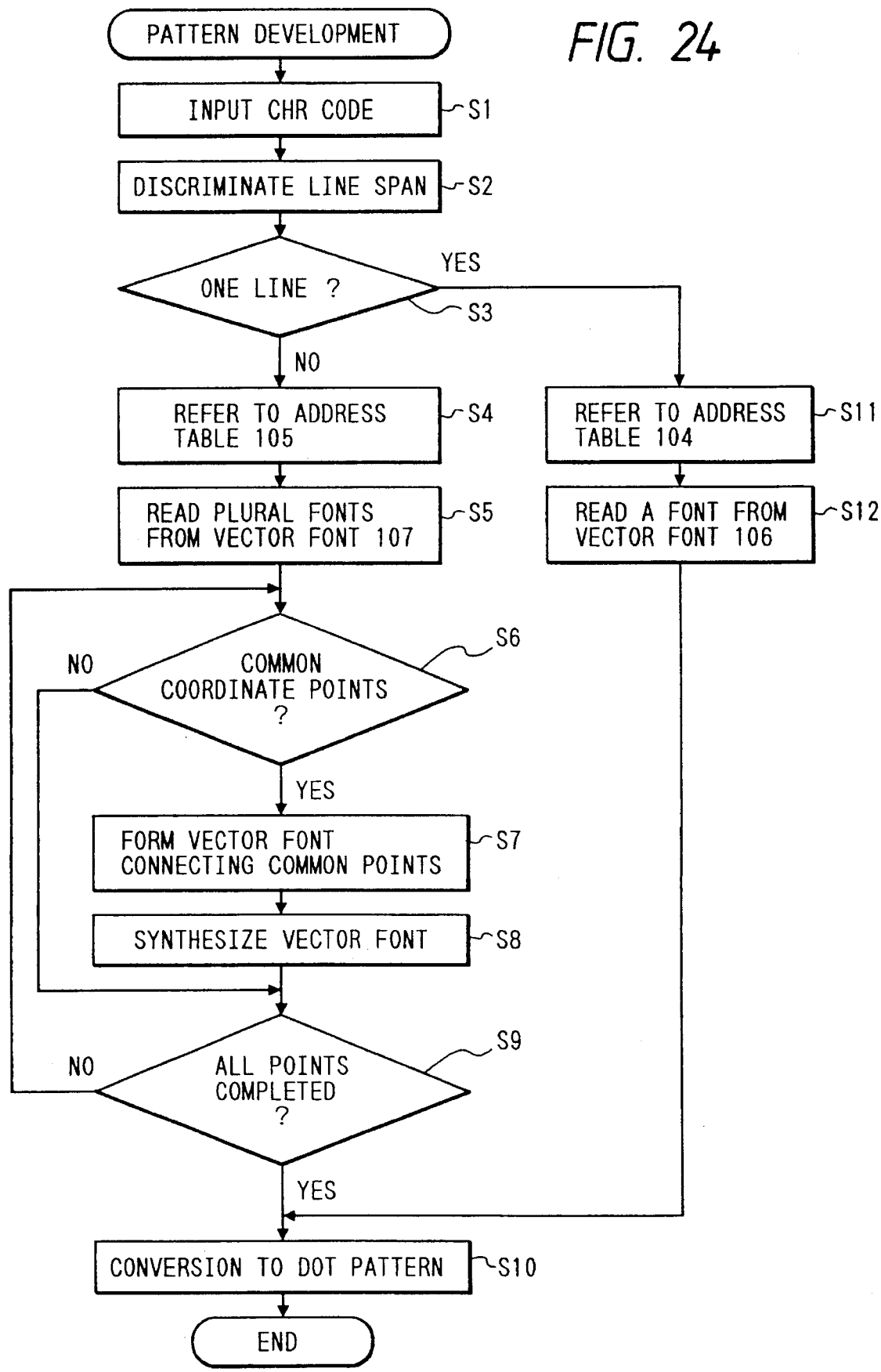
FIG. 24 is a flow chart for explaining the process for correlating end points of the plurality of vector data.

FIG. 24 is a flow chart showing pattern development by the controller 100 in the document processing apparatus of this embodiment. A control program of the CPU 101 which executes this processing is stored in the ROM 102 in the controller 100.

This program is started in response to an input character code. The character code may be input from the keyboard 112 or the like, or a character code representing one character may be read out from a document buffer in the RAM 103. A character code is input in step S1, and line span discrimination is performed in step S2. The flow advances to step S3 to check whether the character code can be developed within one line or extends across a plurality of lines.

If the character represented by the character code is printed or displayed, extending a plurality of lines, the flow advances to step S4. The address table 105 is referred to, and the plurality of vector font data of the font memory 107 are addressed. In step S5, the plurality of addressed font data are read out from the font memory 107, and the readout data are stored in the RAM 103. In step S6, the attribute flags of the coordinate points of the plurality of vector fonts read out from the font memory 107 are checked to determine if a given coordinate point coincides with a coordinate point of another vector font to be synthesized. As described above, this can be easily performed by determining the attribute flags 53. If the given coordinate point and the corresponding coordinate point are the same points, the flow advances to step S7. The common point attribute flag is changed to a flag representing a curved interval.

These common points are connected by a line segment corresponding to line span data in step S8. More specifically, for example, the attribute flag of data 74 representing the sample point 1016 in FIG. 22 is changed to a vector font which will be connected to the sample point 1015. At the same time, a vector font for connecting the sample points 1013 and 1014 is generated, thereby generating a vector font of a closed loop which connects the hatched portions 64 and 65 in FIG. 22.

It is then determined in step S9 whether all the coordinate points are checked. If NO in step S9, the flow returns to step S6. Otherwise, the flow advances to step S10. In step S10, the vector font data is converted into dot pattern data. This dot pattern data is stored in the image memory 116 or the video memory 111.

If the character represented by the character code is determined in step S3 to be displayed or printed within one line, the flow advances to step S11. The font data of the font memory 106 are addressed by the address table 104. In step S12, one-character pattern data is read out from the font memory 106. The vector font is converted into a dot pattern in step S10. The dot pattern is then stored in the image memory 116. The pattern data stored in the image memory 116 is output and printed at the printer 114, or is stored in the video memory 111 and read out and displayed on the CRT display 110.

According to this embodiment as described above, plural divided vector fonts are stored in units of lines. When a pattern of a character or the like is printed or displayed, extending across a plurality of lines, a vector pattern obtained by connecting the plural divided patterns is generated. The synthesized vector pattern is converted into a dot pattern, thereby facilitating generation of the dot pattern.

For the illustrative convenience, the two-line span operation is exemplified. However, a span operation of three or more lines can be performed. In this case, three or more span font data are stored in a memory, as a matter of course.

In synthesis, common points of vector fonts are connected to eliminate unnecessary boundary lines between the vector fonts. Therefore, operations such as character painting or its reversal operation can be easily performed.

In the above embodiment, common points overlap each other. However, the present invention is not limited to this technique. For example, fonts may be synthesized by interpolating common points with a line or the like. A synthesized character can be easily obtained in any line span operation.

According to this embodiment, when plural vector fonts are synthesized to generate a vector font corresponding to an input character or symbol, common points of the vector fonts are connected to obtain a vector font. Therefore, development of the vector font into a dot pattern can be simplified.

Since a connecting line is not inserted in a connecting portion, a high-quality character can be obtained when a hollow character or a flourished character with hatching can be obtained.

[Description of Document Processing Apparatus; Shape Modification of Character Pattern According to Development Area]

Figure 25:
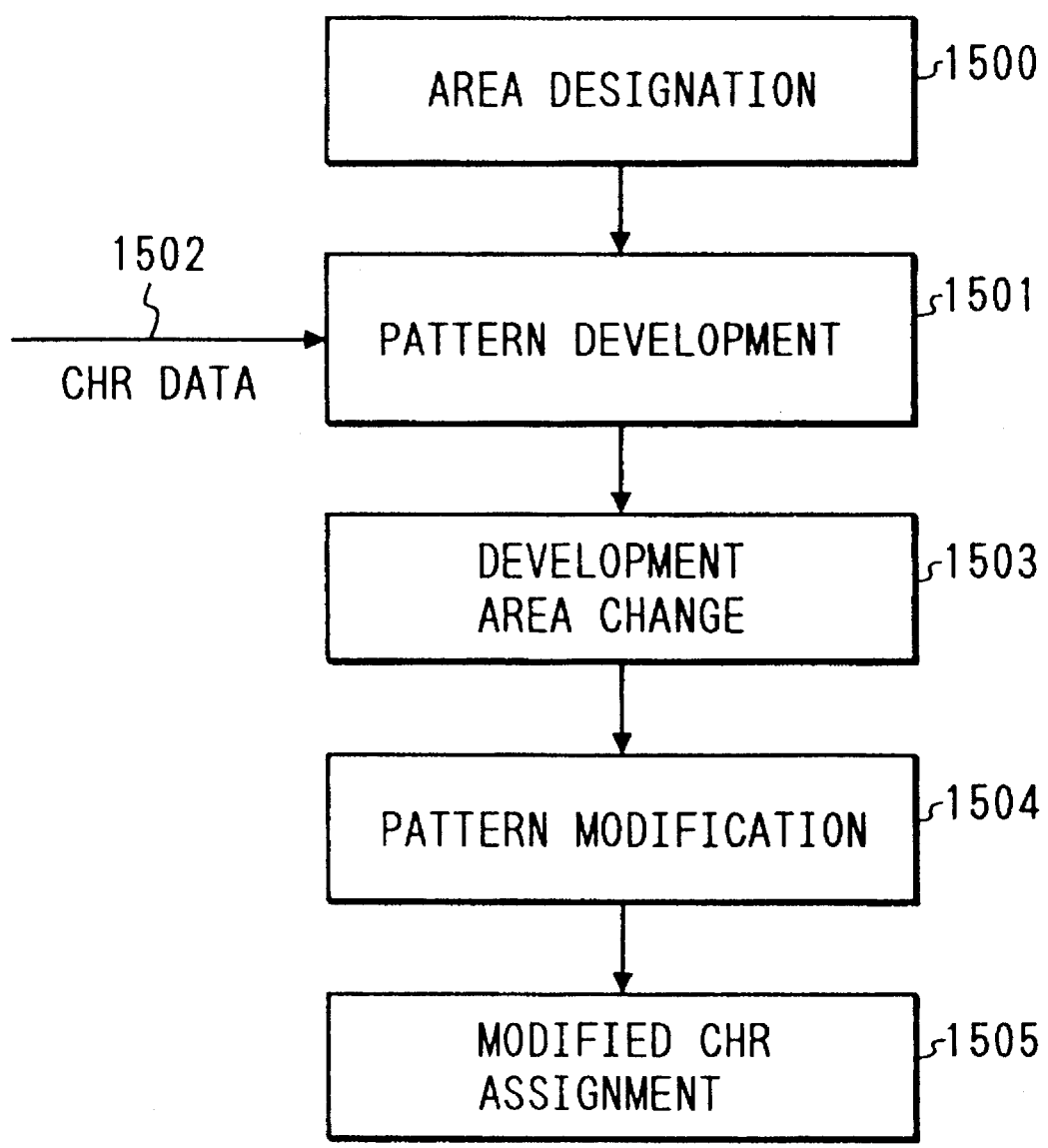
FIG. 25 is a functional block diagram of a document processing apparatus according to still another embodiment of the present invention.

FIG. 25 is a functional block diagram of a document processing apparatus according to still another embodiment of the present invention. In this embodiment, various shape modifications are performed in accordance with the development area when a dot pattern is developed on the basis of the synthesized vector pattern and a vector pattern representing one character.

Referring to FIG. 25, a development area designation section 1500 designates a display frame of a character to be input and displayed. This display frame is designated by all operator who uses a keyboard and a pointing device. When a character code 1502 is input, a pattern development section 1501 reads out font data corresponding to the character code 1502, and develops the font data within a display area designated by the area designation section 1500. Upon an operator's operation using the keyboard and the mouse, a development area change section 1503 changes the shape of the display area designated by the area designation section 1500. When the shape of the development area is changed or modified, a character pattern within the display area is modified by a pattern modification section 1504 in accordance with a modification amount of the display area. A modified character assignment section 1505 assigns the modified character pattern to the display area and displays it in the display area.

[Description of Document Processing Apparatus (FIG. 26)]

Figure 26:
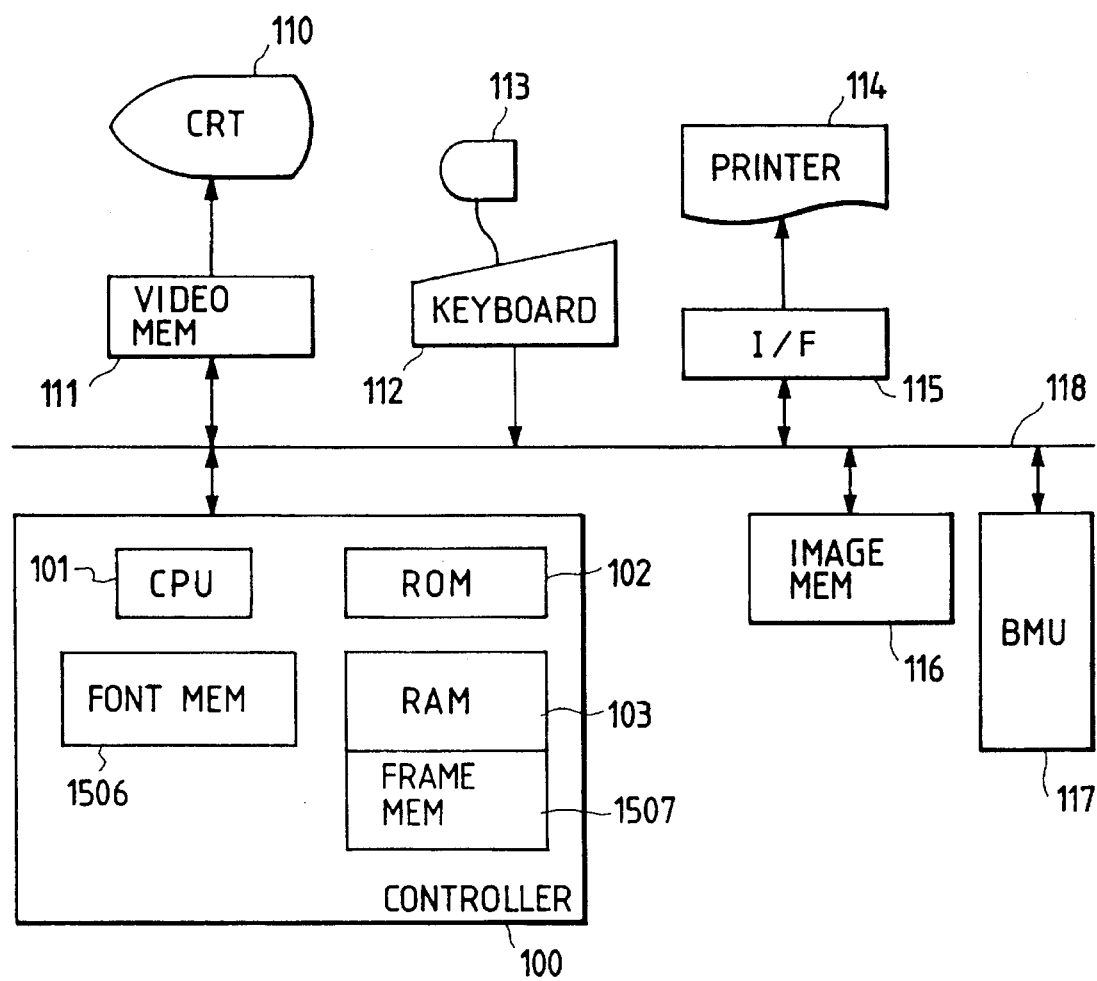
FIG. 26 is a block diagram showing a schematic arrangement of the document processing apparatus shown in FIG. 25.

FIG. 26 is a block diagram showing a schematic arrangement of a document processing apparatus according to still another embodiment of the present invention. The same reference numerals as in FIG. 1 denote the same parts in FIG. 26.

Referring to FIG. 26, a controller 100 controls the overall operation of the document processing apparatus. The controller 100 includes a CPU 101 such as a microprocessor, a ROM 102 storing control programs (to be described later with reference to a flow chart) and various data, and a RAM 103 serving as a work area of the CPU 101 to temporarily store various data, input document data, and frame data (to be described later). A font memory 1506 stores font data corresponding to character codes. The font data stored in the font memory 1506 may be a dot pattern font or vector font data. A frame data memory 1507 stores frame data (e.g., a character displayed on a CRT display 110) designated by a pointing device 113 or a keyboard 112.

The CRT display 110 displays an image corresponding to dot data stored in a video memory 111, input document data, a message to an operator, and control data. The keyboard 112 inputs document data and allows the operator to input control data. The pointing device 113 is used to move a cursor on the CRT display 110, designate a command image such as an icon to input a command, designate a coordinate position on the screen, and designate a display area of a character or the like. A printer 114 comprises, e.g., a laser beam printer. An interface 115 interfaces the printer 114 and the controller 100. An image memory 116 stores image data representing characters or the like. Image data is read out from the image memory 116 and is produced as an image at the printer 114 or the like in accordance with a command output from the keyboard 112 and the mouse 113.

A bit manipulation unit (BMU) 117 is used as a pattern modification section 13 and a development area change section 12 in this embodiment. The BMU 117 performs DMA-transfer between the video memory 111, the image memory 116, and the RAM 103 without control of the CPU 101. At the time of transfer, the BMU 117 performs logical calculations in units of bits, variable magnification and rotation of a developed graphic pattern, and an italic display. When a modification designation is input from the pointing device 113 to modify a display area and any character string developed and displayed on the CRT display 110, a display frame and a character can be modified and displayed in accordance with the input designation.

[Description of Display Area Frame (FIGS. 27 to 29)]

Figure 27:
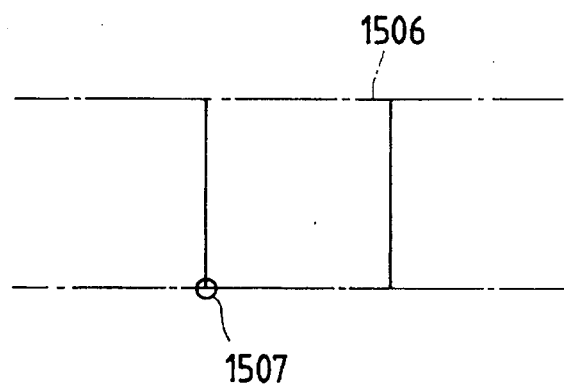
FIG. 27 is a view showing a display frame.

FIG. 27 is a view showing a display area (development area) of a character or the like in this embodiment.

A character development area 1506 can be designated by, e.g., a pointing device upon designation of diagonal points of a rectangular area. A predetermined character pattern is developed in the character development area 1506 from a development start address 1507.

Figure 28A:
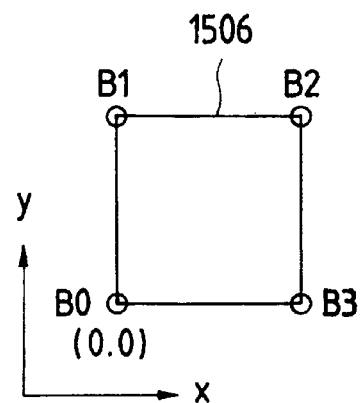
FIG. 28A is a view showing a nonmodified display frame.
Figure 28B:
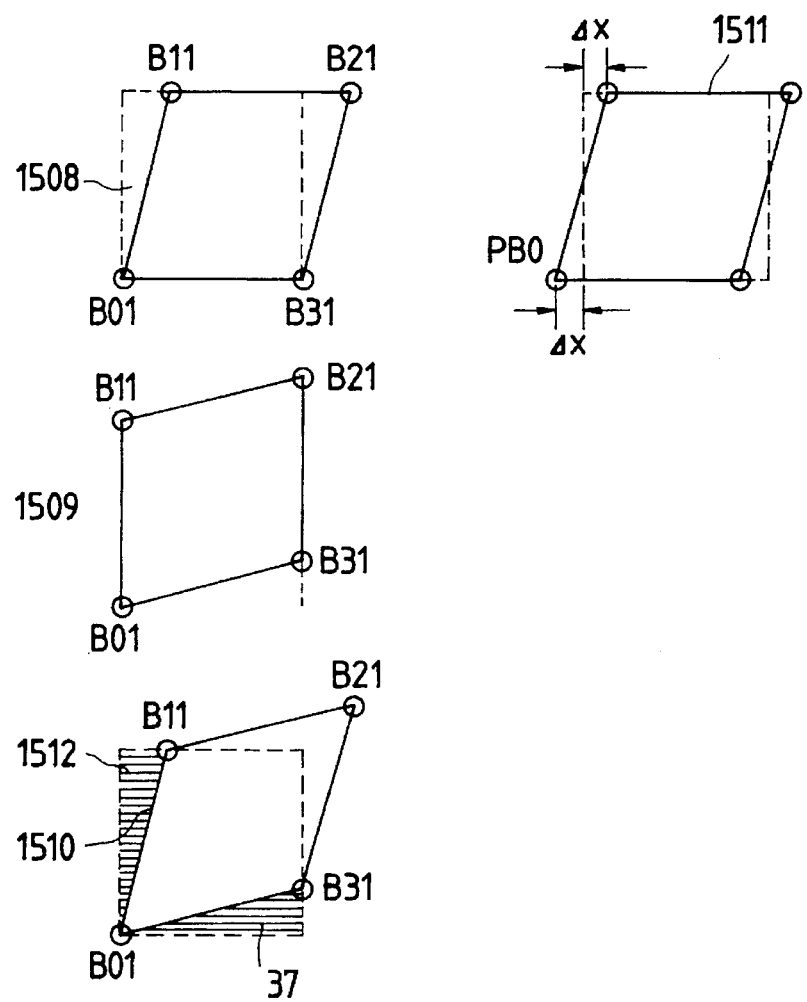
FIG. 28B is a view showing a modified display frame.

FIGS. 28A and 28B are views showing development area modification. FIG. 28(a) represents the development area before modification. This area is defined by addresses B1 to B3 with reference to a start address B0(0,0).

FIG. 28B shows modified development areas 1508 to 1511. These modified areas are defined by addresses B01 to B31. The modified development area 1511 represents a state wherein the modified area 1508 is shifted to an address PB0. Shift amounts can be similarly set for other modified areas 1509 and 1510. The modified area 1511 represents a case wherein a ratio of an increased portion to a decreased portion upon shape modification is set to be 1:1.

The modification operation will be described below. A modification definition screen display (menu screen display) is designated by the pointing device 113 to designate a display area to be modified. A size parameter serving as an output size point and an italic parameter are set in a modification parameter memory area of the RAM 103. When a character code is input from the keyboard 112, it is developed into a pattern in the input display area, so that the character pattern is displayed on the CRT display 110.

The area 1506 before modification, i.e., a standard frame, is defined by start addresses B1 to B3, and the modified areas 1508 to 1511 are defined by input italic parameters. A modified character output position PB1, i.e., an offset amount $\Delta x$ of the modified area 1511 is given as follows:

$$\Delta x = (B11(x) + B01(x))/2$$

since B01(x)=0, the content of the above equation is given as $\Delta x = -11(x)/2$.

The development area 1506 is modified by displaying a modification definition screen. For example, however, a point represented by an address B2 in FIG. 28A may be designated by the pointing device 113, be moved to a point designated by an address B21 of FIG. 27B and then be designated at the latter point, as shown in FIG. 27B.

[Description of Modification of Character Pattern Upon Modification of Development Area (FIGS. 28 & 29)]

Modification of a character pattern represented by a vector font will be described below.

FIGS. 28A and 28B are views showing a state when a shape of a development area is modified. The development area can be modified by visually designating a modification portion and a modification amount with, e.g., a pointing device, or by numerical values input from a keyboard or the like. A character "字" (reads "ji" and means "character") displayed within a development area 513 is italicized by dx in the lateral direction, as shown in the modified area 1514, so that the character "字" is also italicized.

FIG. 30 is a view showing outline data consisting of sample points obtained by sampling the Chinese character "字" by the B-spline scheme.

The sample points of the character "字" are represented by small dots arranged within a 512×512 dot matrix. Each outline data is constituted by a closed loop. According to the B-spline scheme, a spline is generated within an area defined by a sample point and start and end points of a given curved interval.

FIG. 31 is a view showing vector font data similarly given as in FIGS. 5 and 11. A control data area 50 stores JIS codes, vector font size data, and outline data. Sample data areas 71 to 73 store coordinate values of the sample points and attribute flags. The attribute area stores data representing that each sample point is a curved interval, and data representing that each sample point is a start or end point of the curved interval.

Figure 29A:
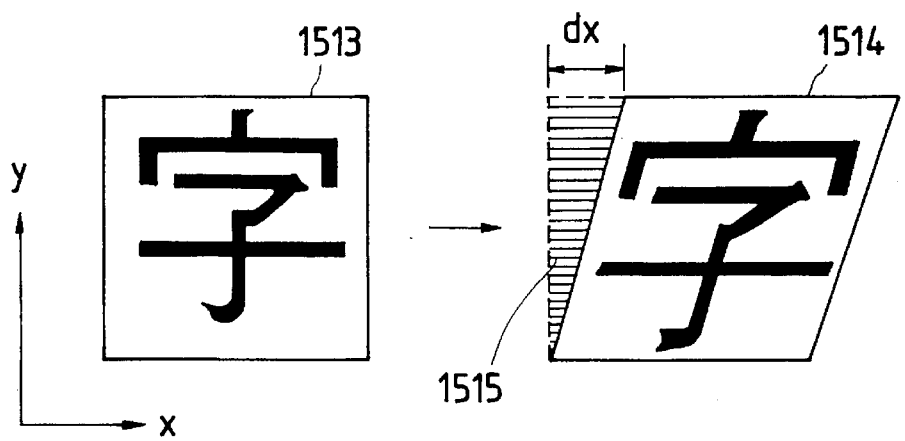
FIGS. 29A and 29C are views showing characters modified upon modifications of the display frames in the document processing apparatus shown in FIG. 25.

This character font data is read out and stored in the RAM 103. When a development area in which this character pattern is developed is modified, as shown in FIG. 29, the x-direction lengths corresponding to y-coordinates of a triangle 1515 of FIG. 29(a) are added to X-coordinates of the vector fonts, and the resultant vector fonts are developed into a pattern, thereby obtaining an italic character shown in FIG. 29(a).

When the modified area 1510 shown in FIG. 28B is used, y- and x-direction shift amounts with respect to the x- and y-coordinates are obtained from triangles 36 and 37 obtained by a shift of B21 with respect to B2 (this shift can be obtained by the address B2 and the coordinates (x,y) of B21 designated by a mouse or the like). The shift amounts are added to the coordinates (X,Y) shown in FIG. 31, thereby generating the corresponding italic pattern.

Figure 29B:
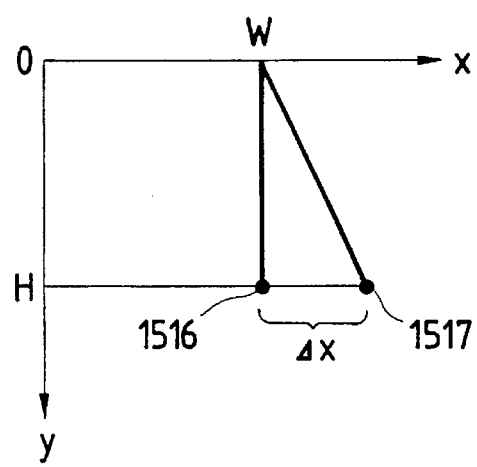
FIG. 29B is a view showing sample points of a modified upon movement of a vertex.
Figure 29C:
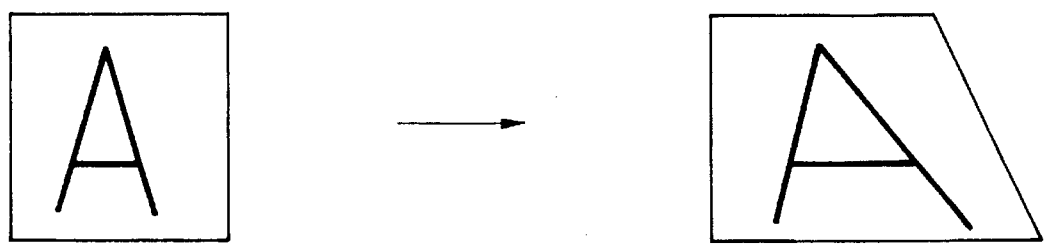

Referring to FIG. 29B, in order to shift a vertex 1516 of a development area to a vertex 1517 by $\Delta x$, a point (x,y) within the development area is mapped into point (x+αxy,y) (where α is a constant). For example, in the case of FIG. 29B, let α be $\Delta x/wh$, thereby obtaining a modification shown in FIG. 29C.

[Description of Development Area Modification (FIG. 32)]

Figure 32:
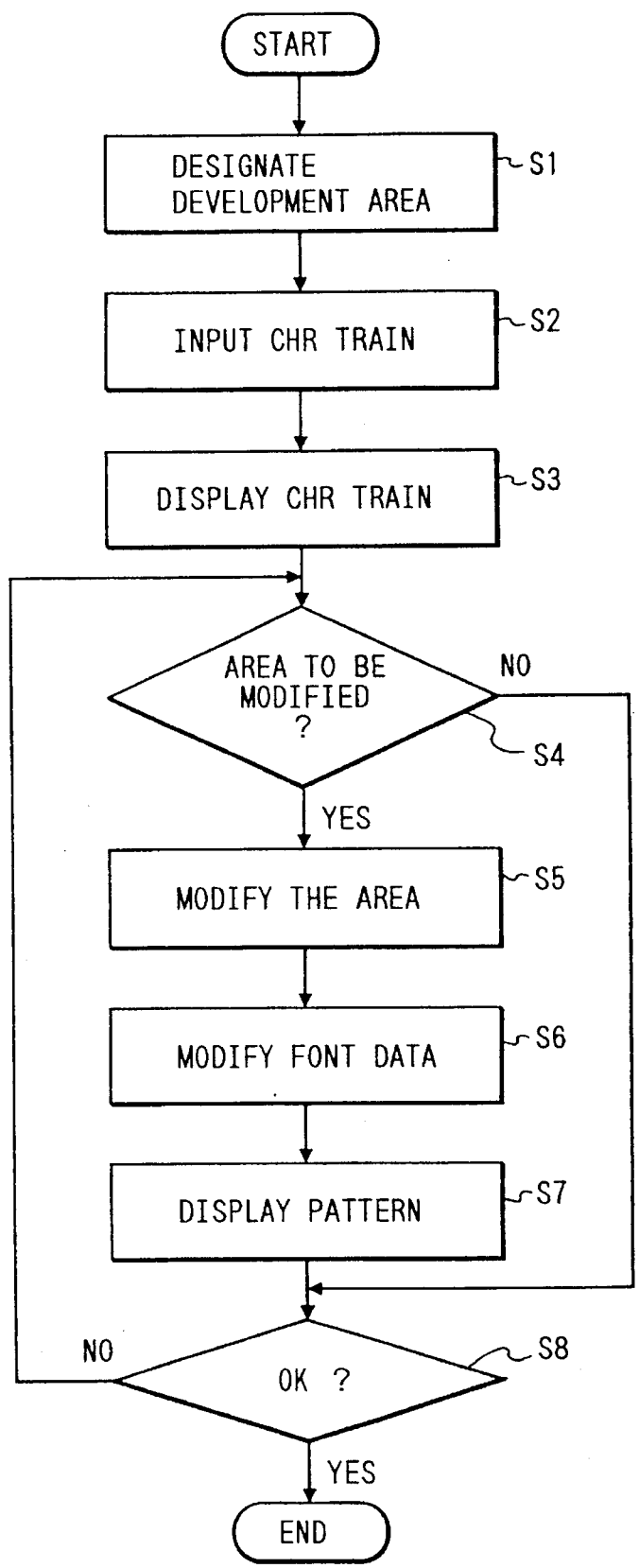
FIG. 32 is a flow chart showing a display frame modification process in the document processing apparatus shown in FIG. 25.

FIG. 32 is a flow chart showing the modification of the development area under the control of the controller 100 in the document processing apparatus of this embodiment. A control program of the CPU 101 for performing this processing is stored in the ROM 102 in the controller 100.

This program is started in response to an input from the keyboard 112 or the pointing device 113. In step S1, a development area is designated by input address values on the CRT display 110 or a definition screen. In step S2, a character string to be displayed within the development area is input. The flow advances to step S3, and the input character string is developed into a pattern with reference to the font memory 1506. The pattern is then stored in the video memory 111 and displayed on the CRT display 110. In this case, the input character string is enlarged or reduced in accordance with the size of the development area, and an enlarged or reduced pattern is displayed.

In step S4, it is checked whether modification data of the development area displayed on the CRT display 110 is input from the keyboard 112 or the mouse 113. If YES in step S4, the flow advances to step S5. The development area is modified in accordance with the designated shape, as shown in FIG. 28B, and the modified area is displayed. In step S6, the shape of the character within the area is then modified in accordance with a modification amount of the development area. As described with reference to FIGS. 29A and 29B, the font data is modified. In step S7, the pattern data development is performed on the basis of the font data, thereby displaying a pattern on the CRT display 110.

In step S8, the apparatus waits until the operator inputs the end of modification of the development area. If YES in step S8, the processing is ended. However, if the operator is not satisfied with the resultant modification and wants to perform modification again, the flow returns to step S4. The above operations are then repeated.

In this embodiment, the character font data are vector font data. However, the present invention is not limited to this. The font data may be dot pattern data of a normal dot image. In this case, rotation and modification of the pattern data are performed by the BMU 117. The number of characters within thee development area is not limited to one but can be two or more.

In this embodiment, a character string already displayed within a development area is modified in accordance with modification of the development area. When a displayed development area which was designated is modified, as shown in FIG. 28B, an input character string may be italicized and displayed from the beginning in accordance with modification of the development area.

According to the embodiment as described above, a development area for displaying a character string is designated and the shape of the development area is modified. A character string displayed within the development area is changed in accordance with the shape of the development area. A change in character design and italicization can be easily performed.

In this embodiment, the modification is based on an affine transform. However, the present invention is also applicable to conversion from a square to a trapezoid, or any other shape.

As still another embodiment, as shown in FIG. 33, a character string is fit in a graphic pattern, each character modification pattern is determined by equally dividing a side by the number of characters, and then the character string can be modified.

According to the present invention, the display frame representing the display area of a character or the like is inclined at a predetermined amount, and a character within the display area can be automatically modified in accordance with a modification amount of the display frame. Therefore, a change in character design and a change in layout can be easily performed.

What is claimed is:

1. A document processing apparatus comprising:

size discriminating means for discriminating whether a character or symbol pattern to be output has a predetermined size;

means for inputting character code information corresponding to a character to be output;

memory means for storing character or symbol pattern data in the form of a plurality of fonts;

discriminating means for discriminating whether a character or symbol pattern to be output exists across a plurality of lines;

first generating means for generating one character or symbol pattern from one dot font data based on one character code in the event said discriminating means discriminates that the character or symbol pattern to be output exists on a single line and that said size discriminating means discriminates that the character or symbol pattern has the predetermined size;

second generating means for generating one character or symbol pattern from a plurality of dot font data based on one character code in the event that said discriminating means discriminates that the character or symbol pattern to be output exists across a plurality of lines and that said size discriminating means discriminates that the character or symbol pattern has the predetermined size;

third generating means for generating one character or symbol pattern from one vector font data based on one character code in the event that said discriminating means discriminates that the character or symbol pattern to be output exists on a single line and that said size discriminating means discriminates that the character or symbol pattern does not have the predetermined size; and fourth generating means for generating one character or symbol pattern from a plurality of vector font data based on one character code in the event that said discriminating means discriminates that the character or symbol pattern to be output exists across a plurality of lines that said size discriminating means discriminates that the character or symbol pattern does not have the predetermined size.

2. A document processing apparatus according to claim 1, wherein said memory means comprises:

additional memory means for storing the dot font data representing a character or a symbol, wherein said apparatus further comprises:

readout means for reading out the dot font data from said additional memory means when a pattern having a size smaller than a predetermined size is to be read out, and for reading out a plurality of vector font data from said memory means when a pattern having a size larger than the predetermined size is to be readout in accordance with a discrimination result of said size discriminating means.

3. An apparatus according to claim 1, further comprising means for registering the font together with a retrieval code for retrieving the font.

4. An apparatus according to claim 1, further comprising output means for outputting the generated pattern.

5. An apparatus according to claim 4, wherein said output means comprises a cathode ray tube.

6. An apparatus according to claim 4, wherein said output means comprises a printer.

7. A document processing apparatus comprising:

means for inputting character code information corresponding to a character to be output;

memory means for storing a plurality of vector fonts representing pattern data of a character or symbol;

vector data correction means for, when one character or symbol is generated from a plurality of vector fonts stored in said memory means, correcting coordinate points common in the plurality of vector fonts to become one so as to delete a common contour line; and size discriminating means for discriminating whether a character or symbol pattern to be output has a predetermined size;

first generating means for generating one character or symbol pattern from one dot font data based on one character code in the event that the character or symbol pattern to be output exists on a single line and that said size discriminating means discriminates that the character or symbol pattern has the predetermined size;

second generating means for generating one character or symbol pattern from a plurality of dot font data based on one character code in the event that the character or symbol pattern to be output exists across a plurality of lines and that said size discriminating means discriminates that the character or symbol pattern has the predetermined size;

third generating means for generating one character or symbol pattern from one vector font data corrected by said vector data correction means based on one character code in the event that the character or symbol pattern to be output exists on a single line and that said size discriminating means discriminates that the character or symbol pattern does not have the predetermined size; and fourth generating means for generating one character or symbol pattern from a plurality of vector font data corrected by said vector data correction means based on one character code in the event that the character or symbol pattern to be output exists across a plurality of lines and that said size discriminating means discriminates that the character or symbol pattern does not have the predetermined size.

8. An apparatus according to claim 7, further comprising output means for outputting the generated pattern.

9. An apparatus according to claim 8, wherein said output means comprises a cathode ray tube.

10. An apparatus according to claim 8, wherein said output means comprises a printer.

11. A document processing apparatus comprising:

input means for inputting character code information corresponding to a character to be output;

memory means for storing dot font data representing a character or symbol and predetermined data representing common points between plural vector fonts;

size discriminating means for discriminating whether a character or symbol pattern to be output has a predetermined size;

discriminating means for discriminating whether a character or symbol pattern to be output exists across a plurality of lines;

connecting means for directly or indirectly connecting the common points of vectors in accordance with the predetermined data so as to generate, from the plural vector fonts, one character pattern or symbol pattern existing across a plurality of lines in the event said discriminating means discriminates that the character or symbol pattern to be output exists across a plurality of lines; and first generating means for generating one character or symbol pattern from one dot font data based on one character code in the event that said discriminating means discriminates that the character or symbol pattern to be output exists on a single line and that said size discriminating means discriminates that the character or symbol pattern has the predetermined size;

second generating means for generating one character or symbol pattern from a plurality of dot font data based on one character code in the event that said discriminating means discriminates that the character or symbol pattern to be output exists across a plurality of lines and that said size discriminating means discriminates that the character or symbol pattern has the predetermined size;

third generating means for generating one character or symbol pattern from one vector font data based on one character code in the event that said discriminating means discriminates that the character or symbol pattern to be output exists on a single line and that said size discriminating means discriminates that the character or symbol pattern does not have the predetermined size; and fourth generating means for generating one character or symbol pattern based on the common points of vectors connected directly or indirectly by said connecting means from a plurality of vector font data based on one character code in the event that said discriminating means discriminates that the character or symbol pattern to be output exists across a plurality of lines and that said size discriminating means discriminates that the character or symbol pattern does not have the predetermined size.

12. An apparatus according to claim 11, further comprising output means for outputting the generated pattern.

13. An apparatus according to claim 12, wherein said output means comprises a cathode ray tube.

14. An apparatus according to claim 12, wherein said output means comprises a printer.

15. A document processing method using a memory which stores character or symbol pattern data in the form of a plurality of fonts, said method comprising the steps of:

inputting character code information corresponding to a character to be output;

discriminating whether a character or symbol pattern to be output has a predetermined size in a first discriminating step;

discriminating whether a character or symbol pattern to be output exists across a plurality of lines in a second discriminating step;

generating one character or symbol pattern from one dot font data based on one character code in the event that said second discriminating step discriminates that the character or symbol pattern to be output exists on a single line and that said first discriminating step discriminates that the character or symbol pattern has the predetermined size;

generating one character or symbol pattern from a plurality of dot font data based on one character code in the event that said second discriminating step discriminates that the character or symbol pattern to be output exists across a plurality of lines and that said first discriminating step discriminates that the character or symbol pattern has the predetermined size;

generating one character or symbol pattern from one vector font data based on one character code in the event that said second discriminating step discriminates that the character or symbol pattern to be output exists on a single line and that said first discriminating step discriminates that the character or symbol pattern does not have the predetermined size; and generating one character or symbol pattern from a plurality of vector font data based on one character code in the event that said second discriminating step discriminates that the character or symbol pattern to be output exists across a plurality of lines and that said first discriminating step discriminates that the character or symbol pattern does not have the predetermined size.

16. A document processing method according to claim 15, wherein the memory means comprises an additional memory, said method further comprising the steps of:

storing the dot font data representing a character or a symbol in the additional memory;

reading out the dot font data from the additional memory when a pattern having a size smaller than a predetermined size is to be read out, and reading out a plurality of vector font data from the memory means when a pattern having a size larger than a predetermined size is to be read out in accordance with a discrimination result of said first discriminating step with a reader.

17. A method according to claim 15, further comprising the step of registering the font together with a retrieval code for retrieving the font.

18. A method according to claim 15, further comprising the step of outputting the generated pattern.

19. A method according to claim 18, wherein said output step is performed with a cathode ray tube.

20. A method according to claim 18, wherein said output step is performed with a printer.

21. A document processing method using a memory which stores a plurality of vector fonts representing pattern data of a character or a symbol, said method comprising the steps of:

inputting a character code information corresponding to a character to be input;

performing vector data correction for, when one character or symbol pattern is generated from a plurality of vector fonts stored in a memory, correcting coordinate points common in the plurality of vector fonts to become one so as to delete a common contour line; and discriminating whether a character or symbol pattern to be output has a predetermined size;

generating one character or symbol pattern from one dot font data based on one character code in the event that the character or symbol pattern to be output exists on a single line and that said size discriminating step discriminates that the character or symbol pattern has the predetermined size;

generating one character or symbol pattern from a plurality of dot font data based on one character code in the event that the character or symbol pattern to be output exists across a plurality of lines and that said size discriminating step discriminates that the character or symbol pattern has the predetermined size;

generating one character or symbol pattern from one vector font data corrected in said vector data correction step based on one character code in the event that the character or symbol pattern to be output exists on a single line and that said size discriminating step discriminates that the character or symbol pattern does not have the predetermined size; and generating one character or symbol pattern from a plurality of vector font data corrected in said vector data correction step based on one character code in the event that the character or symbol pattern to be output exists across a plurality of lines and that said size discriminating step discriminates that the character or symbol pattern does not have the predetermined size.

22. A method according to claim 21, further comprising the step of outputting the generated pattern.

23. A method according to claim 22, wherein said output step is performed with a cathode ray tube.

24. A method according to claim 22, wherein said output step is performed with a printer.

25. A document processing method using a memory which stores dot font data and predetermined data representing common points between a plurality of vector fonts, said method comprising the steps of:

discriminating whether a character or symbol pattern to be output has a predetermined size in a first discriminating step;

inputting character code information corresponding to a character to be input;

discriminating whether a character or symbol pattern to be output exists across a plurality of lines in a second discriminating step;

connecting with a connecting device directly or indirectly the common points of vectors in accordance with the predetermined data so as to generate, from stored plural vector fonts, one character pattern or symbol pattern existing across a plurality of lines in the event that it is discriminated that the character or symbol pattern to be output exists across a plurality of lines; and generating one character or symbol pattern from one dot font data based on one character code in the event that said second discriminating step discriminates that the character or symbol pattern to be output exists on a single line and that said first discriminating step discriminates that the character or symbol pattern has the predetermined size;

generating one character or symbol pattern from a plurality of dot font data based on one character code in the event that said second discriminating step discriminates that the character or symbol pattern to be output exists across a plurality of lines and that said first discriminating step discriminates that the character or symbol pattern has the predetermined size;

generating one character or symbol pattern from one vector font data based on one character code in the event that said second discriminating step discriminates that the character or symbol pattern to be output exists on a single line and that said first discriminating step discriminates that the character or symbol pattern does not have the predetermined size; and generating one character or symbol pattern from a plurality of vector font data based on common points of vectors connected directly or indirectly in said connecting step based on one character code in the event that said second discriminating step discriminates that the character or symbol pattern to be output exists across a plurality of lines and that said first discriminating step discriminates that the character or symbol pattern does not have the predetermined size.

26. A method according to claim 25, further comprising the step of outputting the generated pattern.

27. A method according to claim 26, wherein said output step is performed with a cathode ray tube.

28. A method according to claim 26, wherein said output step is performed with a printer.

* * * * *

UNITED STATES PATENT AND TRADEMARK OFFICE
CERTIFICATE OF CORRECTION

PATENT NO. : 5,574,842        Page 1 of 4
DATED : November 12, 1996
INVENTOR(S) : HIROSHI TAKAKURA, ET AL.

It is certified that error appears in the above-indentified patent and that said Letters Patent is hereby corrected as shown below:

COLUMN 4

Line 61, "modified" should read --modified development area--.

COLUMN 8

Line 56, "d" should read --a--.

COLUMN 9

Line 55, "ride" should be deleted.

COLUMN 11

Line 54, "causes" should be deleted.

COLUMN 12

Line 2, "dislayed" should read --displayed--.

Line 35, "concen-" should be deleted.

Line 36, "trated" should be deleted.

UNITED STATES PATENT AND TRADEMARK OFFICE
CERTIFICATE OF CORRECTION

PATENT NO. : 5,574,842
DATED : November 12, 1996
INVENTOR(S) : HIROSHI TAKAKURA, ET AL.

It is certified that error appears in the above-indentified patent and that said Letters Patent is hereby corrected as shown below:

COLUMN 13

Line 7, "memory 119" should read --memory 119 in--.

COLUMN 14

Line 32, "arid" should read --and--.

COLUMN 18

Line 1, "all" should read --an--.

COLUMN 19

Line 55, " 字" " should read -- 字" --.

COLUMN 20

Line 66, "thee" should read --the--.

UNITED STATES PATENT AND TRADEMARK OFFICE
CERTIFICATE OF CORRECTION

PATENT NO. : 5,574,842        Page 3 of 4
DATED : November 12, 1996
INVENTOR(S) : HIROSHI TAKAKURA, ET AL.

It is certified that error appears in the above-indentified patent and that said Letters Patent is hereby corrected as shown below:

COLUMN 22

Line 21, "font" should read --fonts--.

Line 22, "font." should read --fonts.--

Line 26, "cathode ray tube." should read --display device.--

Line 39, "and" should be deleted.

COLUMN 23

Line 9, "cathode ray tube." should read --display device.--

Line 31, "and" should be deleted.

COLUMN 24

Line 2, "cathode ray tube" should read --display device--.

Line 58, "font" should read --fonts--.

Line 59, "font." should read --fonts.--

Line 63, "cathode ray tube." should read --display device--.

UNITED STATES PATENT AND TRADEMARK OFFICE
CERTIFICATE OF CORRECTION

PATENT NO. : 5,574,842
DATED : November 12, 1996
INVENTOR(S) : HIROSHI TAKAKURA, ET AL.

It is certified that error appears in the above-indentified patent and that said Letters Patent is hereby corrected as shown below:

COLUMN 25

Line 9, "and" should be deleted.

Line 42, "cathode ray tube." should read --display device--.

COLUMN 26

Line 12, "and" should be deleted.

Line 47, "cathode ray tube." should read --display device--.

Signed and Sealed this

Ninth Day of September, 1997

Attest:

BRUCE LEHMAN

Attesting Officer     Commissioner of Patents and Trademarks